US007441624B2

(12) United States Patent
Tobata

(10) Patent No.: US 7,441,624 B2
(45) Date of Patent: Oct. 28, 2008

(54) PASSENGER RESTRAINT DEVICE OF MOTOR VEHICLE

(75) Inventor: Hideo Tobata, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 351 days.

(21) Appl. No.: 10/972,691

(22) Filed: Oct. 26, 2004

(65) Prior Publication Data

US 2005/0087381 A1 Apr. 28, 2005

(30) Foreign Application Priority Data

Oct. 27, 2003 (JP) ............................ 2003-366269

(51) Int. Cl.
*B60R 21/01* (2006.01)
*B60R 21/013* (2006.01)

(52) U.S. Cl. .......................... 180/271; 280/735; 701/45

(58) Field of Classification Search ................. 280/734, 280/735; 180/271, 282; 701/45
See application file for complete search history.

(56) References Cited

U.S. PATENT DOCUMENTS

| | | | | |
|---|---|---|---|---|
| 5,419,407 | A * | 5/1995 | Meyer et al. | 180/274 |
| 5,673,932 | A * | 10/1997 | Nitschke et al. | 280/735 |
| 5,737,224 | A * | 4/1998 | Jeenicke et al. | 701/45 |
| 6,170,864 | B1 * | 1/2001 | Fujita et al. | 280/735 |
| 6,268,803 | B1 * | 7/2001 | Gunderson et al. | 340/903 |
| 6,271,747 | B1 * | 8/2001 | Fendt et al. | 340/436 |
| 6,295,495 | B1 * | 9/2001 | Morman et al. | 701/45 |
| 6,371,515 | B1 * | 4/2002 | Fujishima et al. | 280/735 |
| 6,600,984 | B1 * | 7/2003 | Holzner et al. | 701/45 |
| 6,721,659 | B2 * | 4/2004 | Stopczynski | 701/301 |
| 7,036,621 | B2 * | 5/2006 | Takafuji et al. | 180/274 |
| 7,140,464 | B2 * | 11/2006 | Erb | 180/282 |
| 7,225,069 | B2 * | 5/2007 | Stuetzler | 701/45 |
| 7,236,865 | B2 * | 6/2007 | Prakah-Asante et al. | 701/45 |
| 7,243,944 | B2 * | 7/2007 | Imai et al. | 280/735 |
| 7,250,850 | B2 * | 7/2007 | Mizutani | 340/435 |
| 2001/0028163 | A1 * | 10/2001 | Breed | 280/735 |
| 2003/0149530 | A1 | 8/2003 | Stopczynski | |
| 2003/0236605 | A1 * | 12/2003 | Takahashi | 701/45 |
| 2004/0036261 | A1 * | 2/2004 | Breed | 280/735 |

FOREIGN PATENT DOCUMENTS

| | | |
|---|---|---|
| DE | 198 18 586 C1 | 9/1999 |
| JP | 6-286581 A | 10/1994 |
| JP | 2003-175797 A | 6/2003 |

* cited by examiner

*Primary Examiner*—Christopher Ellis
*Assistant Examiner*—Joseph Rocca
(74) *Attorney, Agent, or Firm*—Foley & Lardner LLP

(57) ABSTRACT

A passenger restraint device of a motor vehicle comprises a plurality of predicting devices each being able to predict or detect a collision of the vehicle with an obstacle in front of the vehicle. A sensitivity adjusting device is able to adjust a sensitivity of at least one of the predicting devices. Reversible passenger restraining devices are able to reversibly restrain a passenger in the vehicle. Non-reversible passenger restraining devices are able to non-reversibly restrain the passenger in the vehicle. A control unit, based on a signal from the one of the predicting devices that has been subjected to the sensitivity adjustment by the sensitivity adjusting device, controls operation of the reversible and non-reversible passenger restraining devices.

14 Claims, 18 Drawing Sheets

100, 200, 300, 400, 500, 600
30
32
34
33
31
20
10
11
CONTROL UNIT
40

40
CONTROL UNIT
C.P.J.S.
41
S.A.S.
42
C.D.J.S
43
O.T.D.S.
44
M.D.R.D.I.S.
45a
K.B.D.I.S.
45b
C.A.R.D.I.S.
45c
A.B.D.I.S.
45d
MOTOR DRIVEN RETRACTOR (32)
KNEE BOLSTER (31)
CARTRIDGE ACTIVATED RETRACTOR (34)
AIR BAG (33)
L.D.R.S. (10) & ACCELEROMETER
L.D.R.S. (10)
S.D.R.S. (11)
ACCELEROMETER (20)

PASSENGER RESTRAINT DEVICE OF MOTOR VEHICLE

BACKGROUND OF THE INVENTION

1. Field of the Invention

The present invention relates in general to passenger restraint devices of wheeled motor vehicles and more particularly to the passenger restraint devices of a type that includes at least a seat belt and a controller that is configured to control a set position of the seat belt in such a manner that a seat occupant (viz., belt wearing seat occupant) can be safely restrained by the seat belt upon a vehicle collision.

2. Description of the Related Art

Japanese Laid-open Patent Applications (Tokkaihei) 6-286581 and (Tokkai) 2003-175797 show passenger restraint devices of the above-mentioned type. The devices each comprise a seat belt for restraining a seat occupant, first and second pre-tensioners for applying a certain tension to the seat belt and a controller for controlling the first and second pre-tensioners in accordance with prediction and detection of a vehicle collision. The first pre-tensioner is of a reversible (or repeatable) type and the second pre-tensioner is of a non-reversible (or non-repeatable) type. That is, upon predicting a vehicle collision, the controller actuates the first pre-tensioner and upon detecting the vehicle collision, the controller actuates the second pre-tensioner, so that a belt wearing seat occupant is timely and optimally restrained by the seat belt upon the vehicle collision.

SUMMARY OF THE INVENTION

In the passenger restraint devices of the above-mentioned type, operation of the seat occupant restraint device (or seat occupant restraining device) is controlled in accordance with prediction and/or detection of a vehicle collision.

However, the above-mentioned control based on the prediction and/or detection of a vehicle collision tends to fail to exhibit a satisfied safety operation particularly in a case wherein a plurality of seat occupant restraining devices are arranged to be controlled. That is, there is such a possibility that although one of the seat occupant restraining devices can be optimally controlled, the other restraining devices can not be optimally controlled.

Furthermore, such undesirable possibility may increase by various factors besides the above-mentioned prediction and detection, which are for example lowering in precision of the collision prediction and that of the collision detection and the like caused by long use.

For the reasons as mentioned hereinabove, the passenger restraint devices hitherto proposed still have room for improvement in the operation of the seat occupant restraining devices.

It is therefore an object of the present invention to provide a passenger restraint device of a motor vehicle, which is free of the above-mentioned shortcomings.

In accordance with a first aspect of the present invention, there is provided a passenger restraint device of a motor vehicle, comprises a plurality of predicting devices each being able to predict or detect a collision of the vehicle with an obstacle in front of the vehicle; a sensitivity adjusting device that is able to adjust a sensitivity of at least one of the predicting devices; reversible passenger restraining devices that are able to reversibly restrain a passenger in the vehicle; non-reversible passenger restraining devices that are able to non-reversibly restrain the passenger in the vehicle; and a control unit that, based on a signal from the one of the predicting devices that has been subjected to the sensitivity adjustment by the sensitivity adjusting device, controls operation of the reversible and non-reversible passenger restraining devices.

In accordance with a second aspect of the present invention, there is provided a passenger restraint device of a motor vehicle, which comprises a plurality of predicting devices each being able to predict or detect a collision of the vehicle with an obstacle in front of the vehicle; sensitivity adjusting means that adjusts a sensitivity of at least one of the predicting devices; reversible passenger restraining means that reversibly restrain a passenger in the vehicle; non-reversible passenger restraining means that non-reversibly restrain the passenger; and control means that, based on a signal issued from the one of the predicting devices that has been subjected to the sensitivity adjustment by the sensitivity adjusting means, controls operation of the reversible and non-reversible passenger restraining means.

DETAILED DESCRIPTION OF THE EMBODIMENTS

In the following, various embodiments of the present invention will be described with reference to the accompanying drawings.

For ease of description, a vehicle on which a passenger restraint device of the invention is mounted will be called "host vehicle" and a vehicle that runs ahead of the host vehicle will be called "preceding vehicle", in the following.

Figure 1:
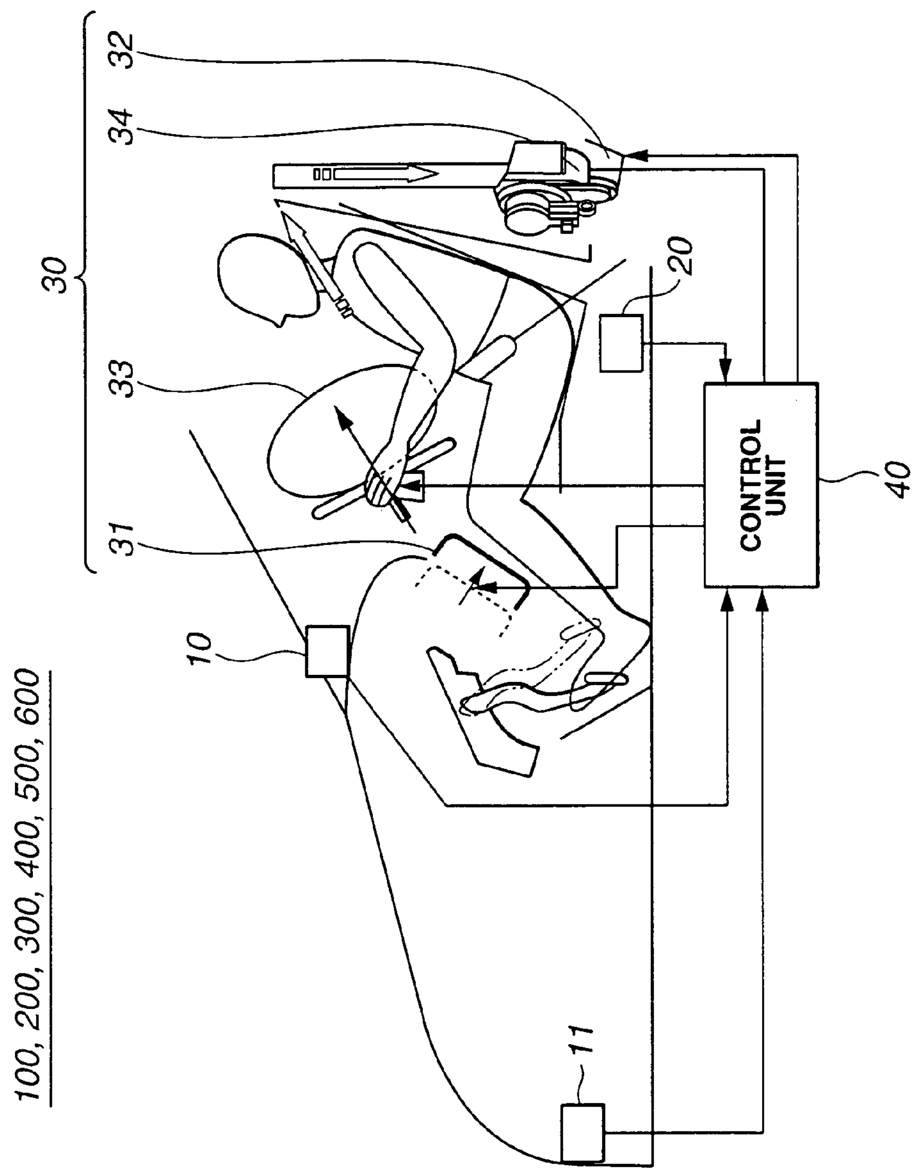
FIG. 1 is a schematic view of a passenger restraint device of a first embodiment of the present invention.

Referring to FIGS. 1 to 11, particularly FIG. 1, there is shown a passenger restraint device 100 which is a first embodiment of the present invention.

As is seen from FIG. 1, passenger restraint device 100 comprises a long distance radar system 10 mounted on a front part of the host vehicle and a short distance radar system 11 mounted on the front part of the vehicle. As will be described in detail hereinafter, each of these two distance radar systems 10 and 11 detects a distance between the host vehicle and a preceding vehicle (or forward obstacle) that runs ahead of the host vehicle. Each radar system 10 or 11 emits an electromagnetic wave against the preceding vehicle and receives a reflected wave from the preceding vehicle, and calculates a distance between the two vehicles by processing a timing of emitting the wave and a timing of receiving the reflected wave. The maximum distance detected by short distance radar system 11 is shorter than that detected by long distance radar system 10. The distance detected by long/short distance radar system 10 or 11 is processed by a control unit 40 for predicting a vehicle collision. For detecting the distance between the two vehicles, a light beam type detector, an ultrasonic wave type detector and the like may be used in place of the radar type.

Passenger restraint device 100 further comprises an accelerometer 20 that detects a collision of the host vehicle with the preceding vehicle. That is, accelerometer 20 detects an abnormally big deceleration of the host vehicle that would be produced when the host vehicle collides against the preceding vehicle.

Passenger restraint device 100 further comprises a passenger restraining unit 30.

Passenger restraining unit 30 comprises a knee bolster 31 that restrains a knee portion of the seat occupant, a motor driven retractor 32 that retracts a seatbelt by an electric power, an air bag 33 that restrains an upper portion of the seat occupant and a cartridge activated retractor 34 that retracts the seatbelt by force of explosive.

It is to be noted that knee bolster 31 and motor driven retractor 32 are of a reversible (or repeatable) type, and air bag 33 and cartridge activated retractor 34 are of a non-reversible (or non-repeatable) type. That is, passenger restraining unit 30 comprises two types of passenger restraining devices, one being of the reversible type and the other being of the non-reversible type.

Passenger restraint device 100 further comprises a control unit 40 that controls four restraining devices 31, 32, 33 and 34 of a passenger restraining unit 30 by processing information signals from long and short distance radar systems 10 and 11 and accelerometer 20. That is, the four restraining devices that are knee bolster 31, motor driven retractor 32, air bag 33 and cartridge activated retractor 34 are controlled by control unit 40 based on the information signals from long and short distance radar systems 10 and 11 and accelerometer 20.

Control unit 40 is a micro-computer that generally comprises a CPU (central processing unit), a RAM (random access memory), a ROM (read only memory) and input and output interfaces. As will become apparent hereinafter, by processing the information signals, control unit 40 carries out a vehicle collision prediction judgment and a vehicle collision detection judgment.

Figure 2:
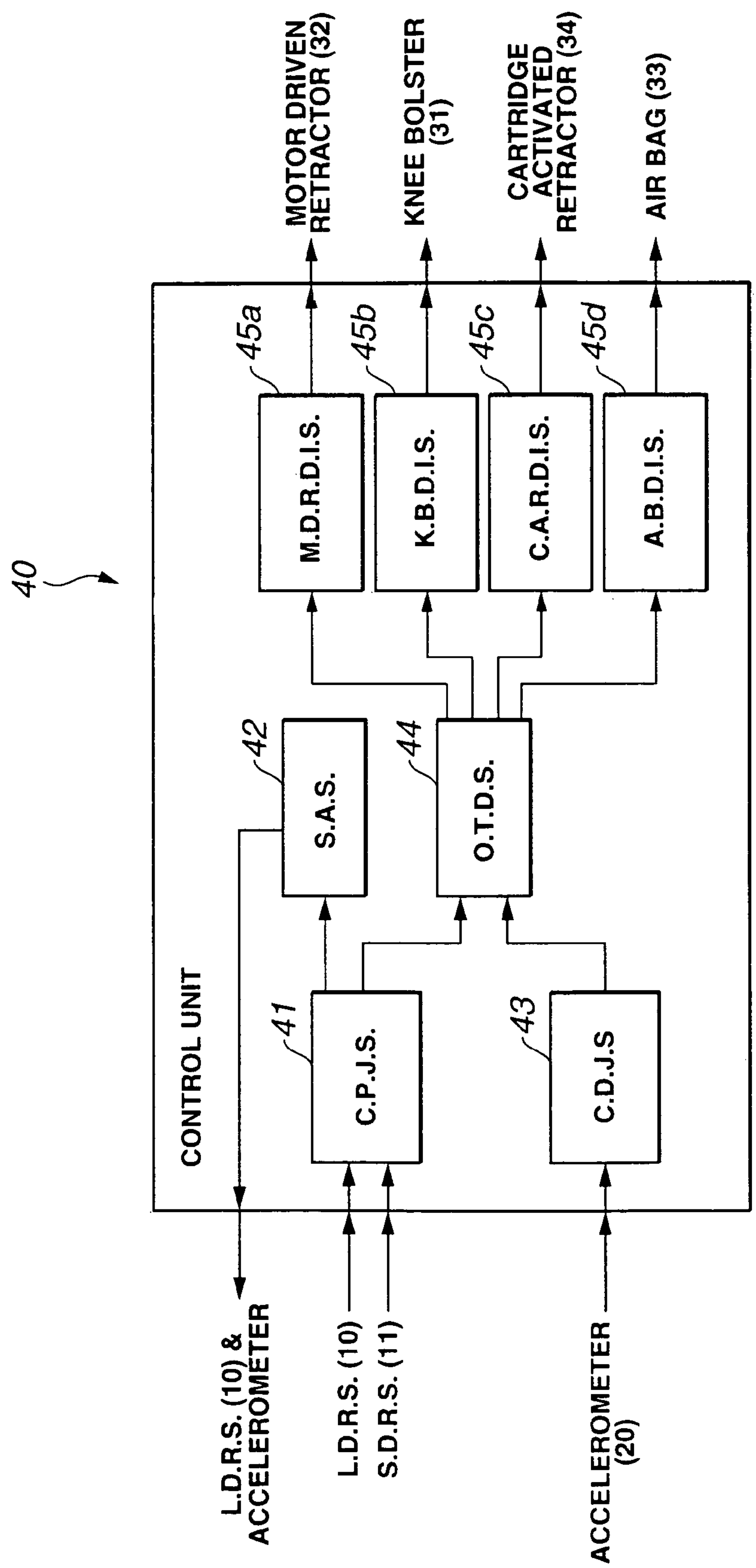
FIG. 2 is a block diagram of a control unit employed in the first embodiment.

FIG. 2 shows a functional block diagram of control unit 40. As shown, control unit 40 comprises a collision prediction judgment section (C.P.J.S) 41, a sensitivity adjusting section (S.A.S.) 42, a collision detection judgment section (C.D.J.S) 43, an operation timing deciding section (O.T.D.S.) 44 and four drive instruction sections 45*a*, 45*b*, 45*c* and 45*d*.

As shown, upon processing information signals from long and short distance radar systems 10 and 11, collision prediction judgment section 41 carries out a prediction as to whether the host vehicle collides against the preceding vehicle or not. Upon receiving signals from collision prediction judgment section 41, sensitivity adjusting section 42 adjusts the sensitivity of at least one of long and short distance radar systems 10 and 11 and accelerometer 20. In the illustrated embodiment, sensitivity adjusting section 42 adjusts the sensitivity of short distance radar system 11 based on the information signal from long distance radar system 10.

Upon processing information signals from accelerometer 20, collision detection judgment section 43 carries out a judgment as to whether a collision of the host vehicle against the preceding vehicle has actually occurred or not.

Based on result representing signals from collision prediction judgment section 41 and collision detecting judgment section 43, operation timing deciding section 44 decides operation timings of knee bolster 31, motor driven retractor 32, air bag 33 and cartridge activated retractor 34. The instruction signals from operation timing deciding section 44 are led to drive instruction sections 45*a*, 45*b*, 45*c* and 45*d* to drive motor driven retractor 32, knee bolster 31, cartridge activated retractor 34 and air bag 33 respectively in accordance with the operation timings decided by the section 44.

Figure 3:
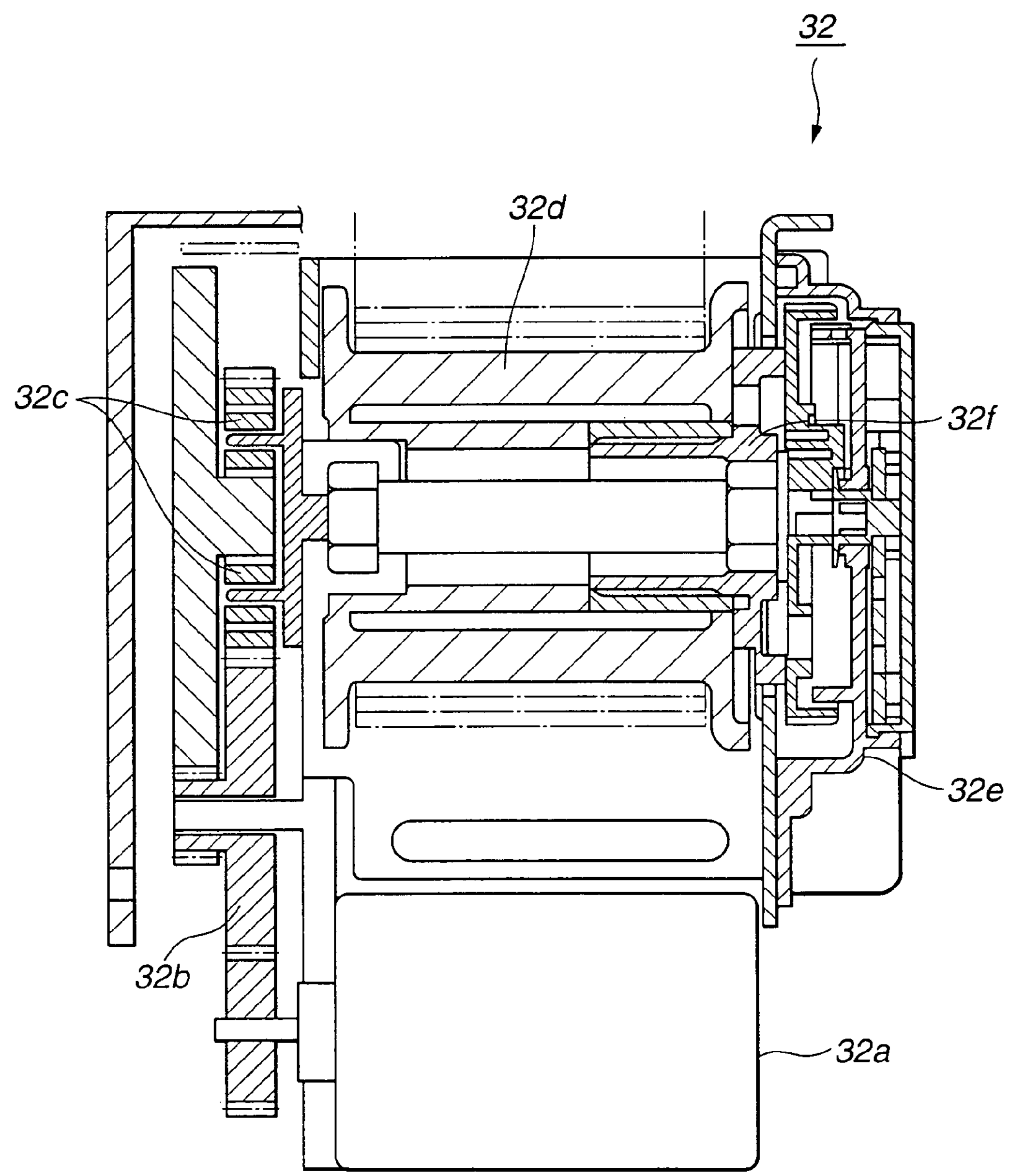
FIG. 3 is a sectional view of a motor-driven belt retractor.

FIG. 3 shows the detail of motor driven retractor 32 which has in addition to known basic elements an electric motor 32*a*, a speed reduction gear 32*b* and planetary gears 32*c*. That is, upon energization of electric motor 32*a*, a torque of motor 32*a* is transmitted to speed reduction gear 32*b* and to planetary gears 32*c*. The torque of which speed has been reduced by speed reduction gear 32*b* is applied through planetary gears 32*c* to a real 32*d* thereby to wind up thereon the seatbelt.

Motor driven retractor 32 further has a lock gear 32*e* and a lock mechanism 32*f*. Due to provision of lock gear 32*e* and lock mechanism 32*f*, withdrawing of the seat belt from retractor 32 is suppressed at the time when, due to a vehicle collision or the like, an abnormally big shock is applied to retractor 32.

Figure 4A:
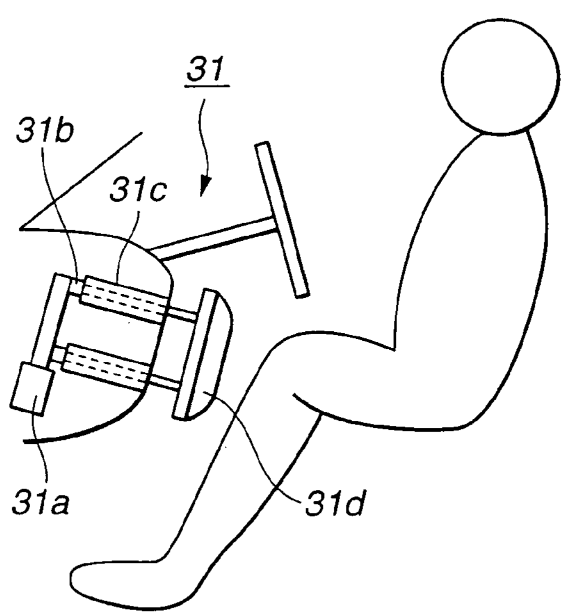
FIG. 4A is a schematic view of a knee bolster.
Figure 4B:
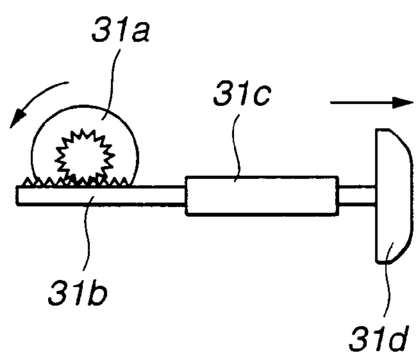
FIG. 4B is a schematic view of an essential part of the knee bolster.

FIGS. 4A and 4B show electric knee bolster 31. As is seen from FIG. 4A, knee bolster 31 comprises an electric motor 31*a*, a gear assembly 31*b* and a cylinder assembly 31*c* which are installed in an interior panel in front of a seat, and a bolster pad 31*d* which is connected to cylinder assembly 31*c*. As is understood from FIG. 4B, upon energization of electric motor 31*a*, gear assembly 31*b* is operated to push or draw bolster pad 31*d* through cylinder assembly 31*c*. Although not shown in the drawings, in a rest condition, bolster pad 31*d* is kept in a cover member of the interior panel.

Upon a collision threat, such as in case wherein there is a high possibility of collision of the vehicle with a preceding vehicle, electric motor 31*a* is energized to instantly push out bolster pad 31*d* to support the knee portion of the seat occupant. With this, forward movement of the seat occupant is assuredly suppressed. While, upon being free from the collision threat, such as in case wherein the possibility of the vehicle collision is removed thereafter, bolster pad 31*d* is instantly drawn to a retracted position.

Referring back to FIG. 1, air bag 33 comprises an air bag proper and a gas generator. That is, upon a vehicle collision, the gas generator is energized to instantly fill the air bag proper with a gas. With this, the upper half portion of the seat occupant is softly supported by the air bag proper.

Cartridge activated retractor 34 is constructed to make an instant but small winding of the seat belt by force of explosive upon a vehicle collision. That is, upon the vehicle collision, explosive in the cartridge is burnt to produce a big force with which the seat belt is retracted by a reel. With this, as is seen from FIG. 1, the upper half portion of the seat occupant is suppressed from inclining largely in a forward direction.

Figure 5:
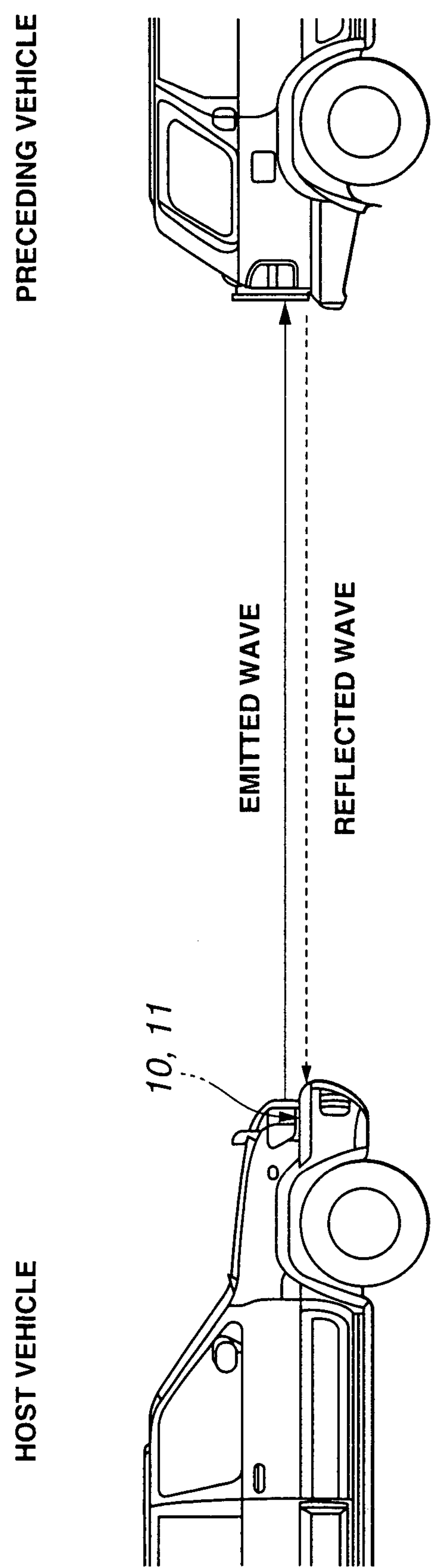
FIG. 5 is an illustration showing operation of long and short distance radar systems mounted on a host vehicle.

As is seen from FIG. 5, each radar system 10 or 11 is arranged to emit an electromagnetic wave forward, that is, toward a preceding vehicle that runs ahead of the host vehicle, and receive a reflected wave from the preceding vehicle. The timing on which the wave is issued from radar system 10 or 11 and that on which the reflected wave is received by radar system 10 or 11 are monitored and inputted to collision prediction judgment section 41 of control unit 40.

By processing the timing of the wave emitting and that of the wave receiving, collision prediction judgment section 41 calculates or estimates a distance between the host vehicle and the preceding vehicle (or forward obstacle). By differentiating the calculated distance by time, the section 41 derives a relative vehicle speed between the host vehicle and the preceding vehicle (or forward obstacle). If desired, the relative speed may be obtained by practically using Doppler effect. By dividing the estimated distance by the relative vehicle speed, the section 41 derives a time on which a possible collision of the host vehicle against the preceding vehicle (or forward obstacle) will take place.

Accelerometer 20 is arranged to measure an acceleration that is applied to the vehicle in a forward and backward direction. The acceleration representing signal from accelerometer 20 is fed to collision detection judgment section 43 of control unit 40. By comparing the measured acceleration with a threshold value "Th1", the section 43 judges whether the vehicle collision has occurred or not.

In the following, operation of passenger restraint device 100 of the first embodiment will be described with reference to the flowchart of FIG. 6.

When, an ignition switch (not shown) is turned on for staring the engine, passenger restraint device 100 becomes on. Upon this, long and short distance radar systems 10 and 11 and accelerometer 20 are turned on.

At step ST10, information signal from long distance radar system (that is, L. D. R. S.) 10 is read in collision prediction judgment section 41. At step ST11, based on the information signal from the system 10, the section 41 carries out judgment as to whether a collision of the host vehicle with a preceding vehicle (or obstacle) will take place or not. If NO, that is, when it is judged that the collision will not take place, the operation flow goes to step ST13 which will be described hereinafter. While, if YES at step ST11, that is, when it is judged that collision will take place, the operation flow goes to step ST12 where collision prediction judgment section 41 issues a corresponding signal to sensitivity adjusting section 42 to adjust the sensitivity of short distance radar system (or S.D.R.S) 11. Then, the operation flow goes to step ST13.

At step ST13, information signal from short distance radar system 11 is read in collision prediction judgment section 41. Then, at step ST14, based on the information signal from the system 11, the section 41 carries out judgment as to whether a collision of the host vehicle with the preceding vehicle (or forward obstacle) will take place or not. If NO, that is, when it is judged that the collision will not take place, the operation flow goes back to step ST10. While, if YES at step ST14, the operation flow goes to step ST15. It is to be noted that collision prediction judgment section 41 outputs a judgment result based on the information from short distance radar system 11. At step ST15, information signal from accelerometer 20 is read in collision detection judgment section 43. Then the operation flow goes to step ST16. At this step, the section 43 judges whether the vehicle collision has actually taken place or not. If NO, that is, when it is judged that the collision has not taken place, the operation flow goes back to step ST10. While, if YES, that is, when it is judged that the collision has taken place actually, the operation flow goes to step ST17. At this step, operation timings of knee bolster 31, motor driven retractor 32, air bag 33 and cartridge activated retractor 34 are decided in operation timing deciding section 44. Then, at step ST18, the devices 31, 32, 33 and 34 are actuated by the four drive instruction sections 45*b*, 45*a*, 45*d* and 45*c* at the timings decided at step ST17.

Then, the operation flow goes to step ST19. At this step, judgment is carried out as to whether the ignition switch has been turn off or not. If NO, that is, when the ignition switch is kept ON, the operation flow goes back to step ST10. While, if YES, that is, it is judged that the ignition switch has been turn off, the operation is ended.

In the following, the sensitivity adjustment carried out at step ST12 of the flowchart of FIG. 6 will be described in detail with reference to FIG. 7.

In the illustrated example, due to adjustment of the sensitivity of short distance radar system 11, the detecting range of the radar system 11 is increased. That is, upon adjustment of the sensitivity, the detecting ability of short distance radar system 11 is raised.

Figure 6:
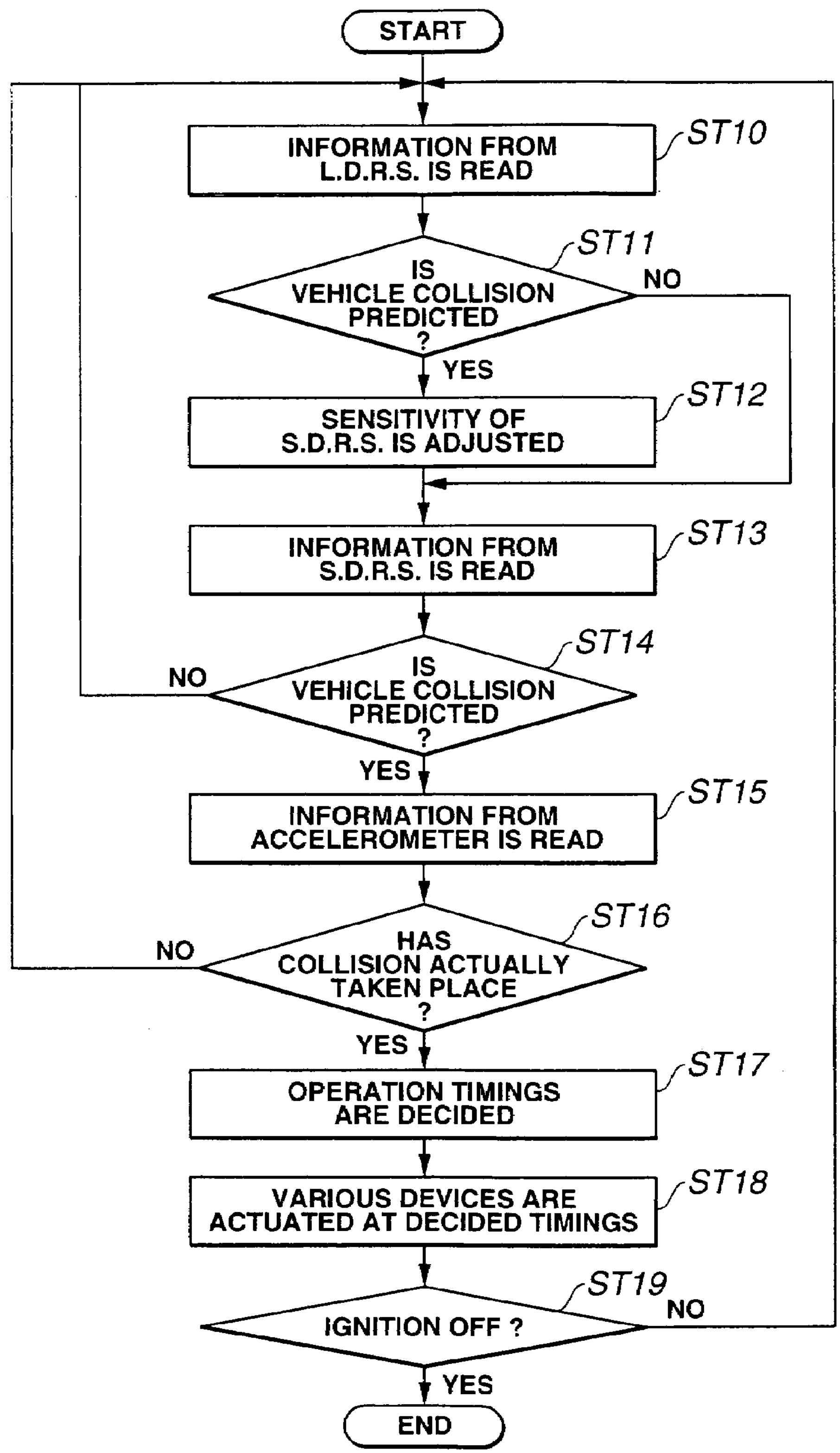
FIG. 6 is a flowchart showing programmed operation steps executed in a control unit of the first embodiment.
Figure 7:
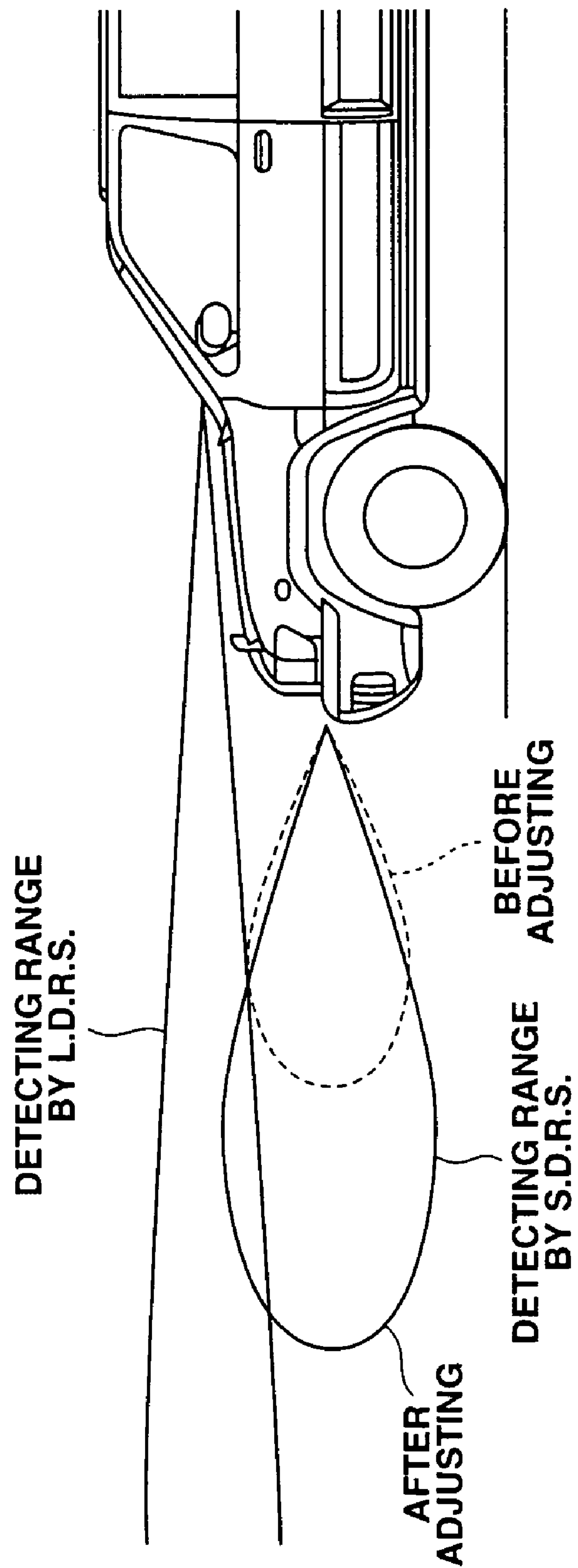
FIG. 7 is an illustration of a host motor vehicle on which the passenger restraint device of the invention is mounted, the illustration depicting a sensitivity adjusting treatment (step 12) of the flowchart of FIG. 6.

As is understood from the flowchart of FIG. 6, the sensitivity adjustment of short distance radar system 11 is carried out in a case wherein a vehicle collision is predicted based on the information signal issued from long distance radar system 10. It is to be noted that the possibility of the vehicle collision is higher in case wherein the collision is predicted based on the information signal from long distance radar system 10 than in case wherein such collision is not predicted based on the information signal from long distance radar system 10. That is, the sensitivity of the radar system 11 is increased when a possibility of vehicle collision is high. In other words, upon having a higher possibility of the vehicle collision, short distance radar system 11 is changed to have a longer detecting range.

Accordingly, due to the higher possibility of vehicle collision, resetting the system 11 to have a longer detecting range lowers a possibility of misjudgment. That is, undesired matter wherein a vehicle collision is predicted even when the vehicle has no possibility of such collision is suppressed or at least minimized. On the contrary, since, with the higher possibility of vehicle collision maintained, the longer detecting range is given, detection of a preceding vehicle (or obstacle) can be widely obtained, which brings about an assured vehicle collision prediction. Thus, after being adjusted in sensitivity, short distance radar system 11 can be improved in detecting accuracy.

When the detecting accuracy of short distance radar system 11 is improved, the prediction of vehicle collision is reliably carried out even if the vehicle is under a higher speed cruising and/or the vehicle has a very poor visibility owing to the dense fog.

Because of increase of the detecting range, short distance radar system 11 can detect a preceding vehicle (or obstacle) in early stages while carrying out a high precision vehicle collision prediction. As is known, the detecting range of the radar system 11 can be adjusted by varying a wave transmission intensity and/or wave receiving sensitivity.

It is to be noted that the sensitivity may be adjusted by changing the contents of collision prediction judgment section 41 of control unit 40. One example is as follows. For carrying out judgment on a vehicle collision prediction, the section 41 memorizes a threshold value "Th2". By comparing a calculated time left until a predicted vehicle collision with the threshold value "Th2", collision prediction judgment section 41 predicts the vehicle collision when the calculated time is judged shorter than the threshold value "Th2".

In the following, the detail of step ST17 of the flowchart of FIG. 6 will be described with reference to FIG. 8.

Figure 8:
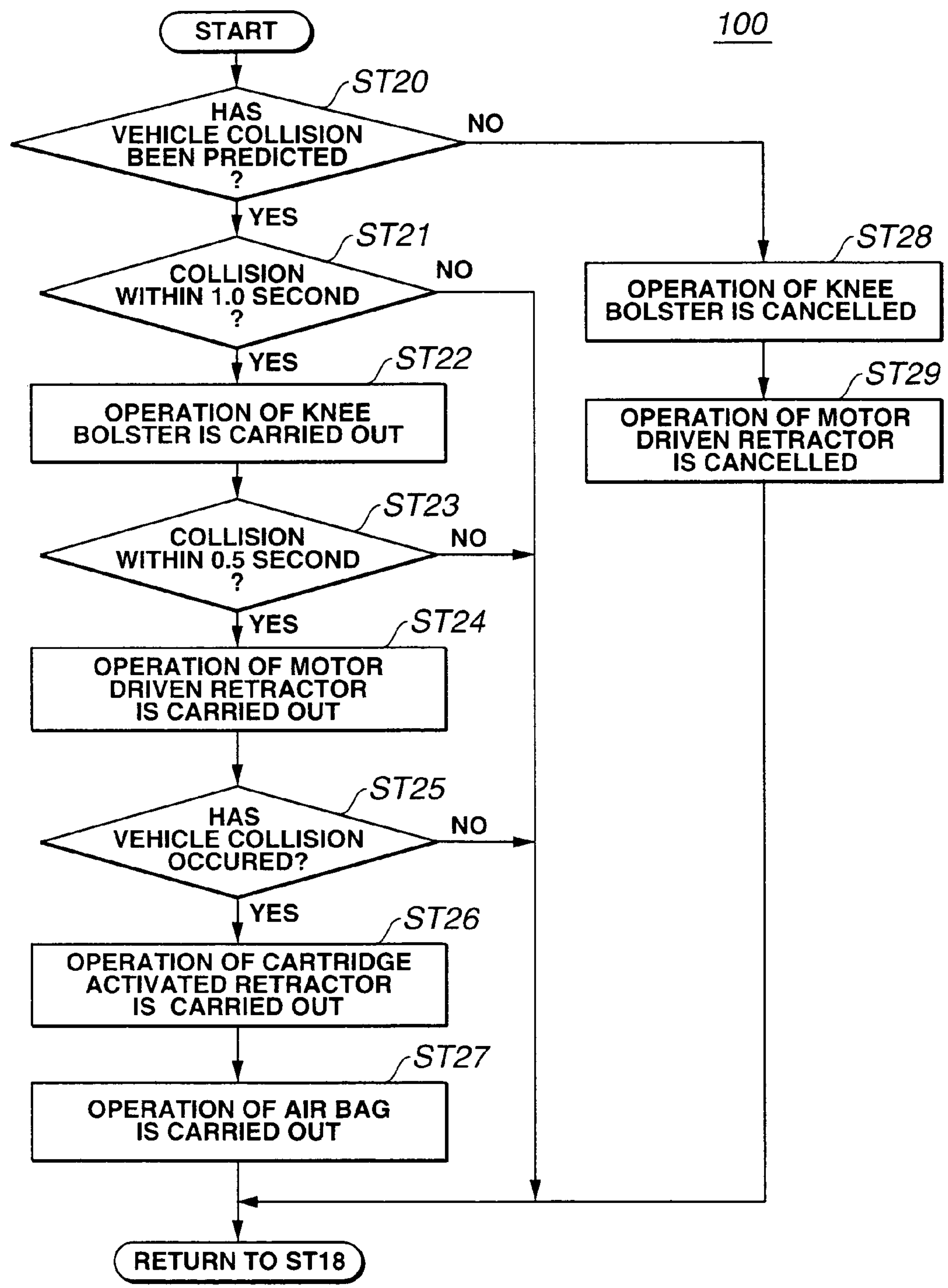
FIG. 8 is a flowchart showing programmed operation steps executed in the control unit for carrying out an operation timing judging treatment (step ST17) of the flowchart of FIG. 6.

That is, FIG. 8 shows operation steps of the operating timing judging treatment carried out in operation timing deciding section 44 of control unit 40 of FIG. 2.

As is seen from the flowchart of FIG. 8, at step ST20, based on information signal from short distance radar system 11, judgment is carried out as to whether a vehicle collision has been predicted or not. More specifically, based on a result provided by collision prediction judgment section 41 based on the information from short distance radar system 11, operation timing deciding section 44 judges a possibility of vehicle collision.

If YES at step ST20, that is, when collision prediction judgment section 41 judges a high possibility of vehicle collision, the operation flow goes to step ST21. At this step, operation timing deciding section 44 carries out judgment as to whether the predicted collision would occur within 1 second or not. If NO, that is, when it is judged that the predicted collision would not occur within 1.0 second, the operation flow goes back to step ST18 of the above-mentioned flowchart of FIG. 6.

While, if YES at step ST21, that is, when it is judged that the vehicle collision would occur within 1.0 second, the operation flow goes to step ST22 judging that knee bolster 31 should be operated. At this step, corresponding instruction signal is fed to knee bolster drive instruction section 45*b* for the operation of knee bolster 31.

Then, at step ST23, operation timing deciding section 44 carries out judgment as to whether the predicted collision would occur within 0.5 second or not.

If NO, that is, when it is judged that the predicted collision would not occur within 0.5 second, the operation flow goes back to step ST18 of the flowchart of FIG. 6.

While, if YES at step ST23, that is, when it is judged that the vehicle collision would occur within 0.5 second, the operation flow goes to step ST24 judging that motor driven retractor 32 should be operated. At this step, corresponding instruction signal is fed to motor driven retractor drive instruction section (M.D.R.D.I.S.) 45*a* for operation of the retractor 32.

Then, the operation flow goes to step ST25. At this step, operation timing deciding section 44 carries out judgment as to whether the vehicle collision has been detected or not. That is, the section 44 judges whether the information signal from collision detection judgment section 43 indicates a vehicle collision or not.

If NO, that is, when it is judged that the vehicle collision has not occurred, the operation flow goes back to step ST18 of the flowchart of FIG. 6.

While, if YES at step ST25, that is, when it is judged that the vehicle collision has occurred, the operation flow goes to step ST26 judging that cartridge activated retractor 34 should be operated. At this step, corresponding instruction signal is fed to cartridge activated retractor drive instruction section (C.A.R.D.I.S.) 45*c* for the operation of cartridge activated retractor 34.

Then, the operation flow goes to step ST27. At this step, operation timing deciding section 44 feeds air bag drive instruction section (A.B.D.I.S.) 45*d* with an instruction signal for the operation of air bag 33. Then, the operation flow goes back to step ST18 of the flowchart of FIG. 6.

While, if NO at step ST20, that is, when collision prediction judgment section 41 does not judge a high possibility of vehicle collision, the operation flow goes to step ST28. At this step, operation timing deciding section 44 cancels operation of knee bolster 31. That is, the section 44 feeds knee bolster drive instruction section (K.B.D.I.S.) 45*b* with an operation canceling instruction. Thus, if knee bolster 31 is being operated, the operation becomes cancelled. Then, the operation flow goes to step ST29 to feed motor driven retractor drive instruction section 45*a* with an operation canceling signal. Then, the operation flow goes back to step ST18 of the flowchart of FIG. 6.

In the following, operation of knee bolster 31 will be described with reference to the flowchart of FIG. 9. It is to be noted that operation of the other restraining devices, which are motor driven retractor 32, air bag 33 and cartridge activated retractor 34, is substantially the same as that of knee bolster 31.

Figure 9:
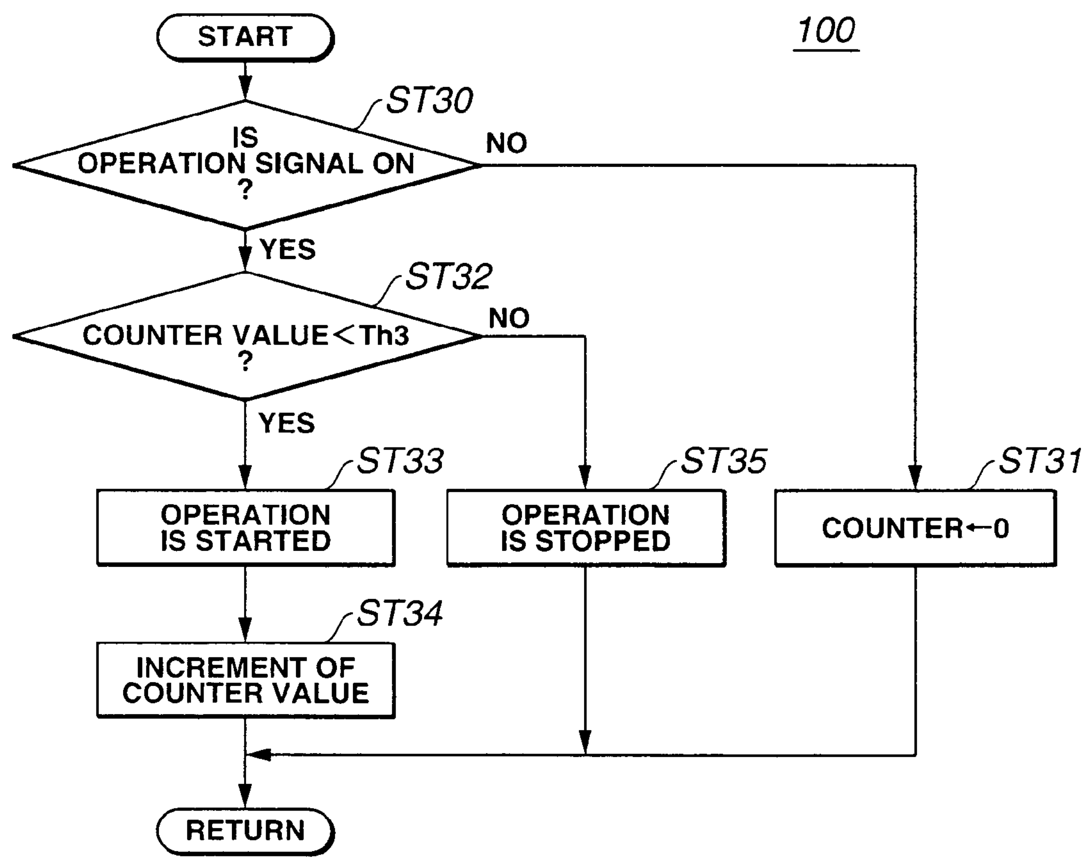
FIG. 9 is a flowchart showing programmed operation steps executed in the control unit for operating each of seat occupant restraining devices.

As shown in the flowchart of FIG. 9, at step ST30, a drive portion of knee bolster 31 judges whether the operation signal is ON or not. That is, the drive portion judges whether the instruction signal from knee bolster drive instruction section 45*b* is ON (drive) signal or OFF (cancel) signal.

If NO at step ST30, that is, when it is judged that the instruction signal from the section 45*b* is OFF signal, the operation flow goes to step ST31. At this step, the drive portion of knee bolster 31 sets a counter to 0 (zero) and the operation flow is returned to step ST30. That is, as long as step ST30 issues NO answer, the value of counter is kept 0 (zero).

While, if YES at ST30, that is, when it is judged that the instruction signal from the section 45*b* is ON signal, the operation flow goes to step ST32. At this step, the drive portion judges whether the value of the counter is smaller than a predetermined threshold value "Th3" or not. If YES, that is, when it is judged that the counter value is smaller than threshold value "Th3", the operation flow goes to step ST33 to start operation of knee bolster 31. Then, at step ST34, the counter value is subjected to increment, and the operation step is returned to step ST30.

If, after repeating the above-mentioned treatment, the counter value exceeds the predetermined threshold value "Th3", the step ST32 issues NO answer. In this case, the operation flow goes to step ST35 to stop operation of knee bolster 31, and then the operation flow is returned to step ST30.

In the manner as mentioned hereinabove, knee bolster 31 is operated to hold or retrain a knee portion of a seat occupant. As is described hereinabove, motor driven retractor 32, air bag 33 and cartridge activated retractor 34 are operated in a manner similar to that of the knee bolster 31 for holding or retraining the seat occupant.

In the following, the detail of step ST11 (vehicle collision prediction) and that of step ST14 (vehicle collision prediction) of the flowchart of FIG. 6 will be described with reference to FIGS. 10A and 10B.

Figure 10A:
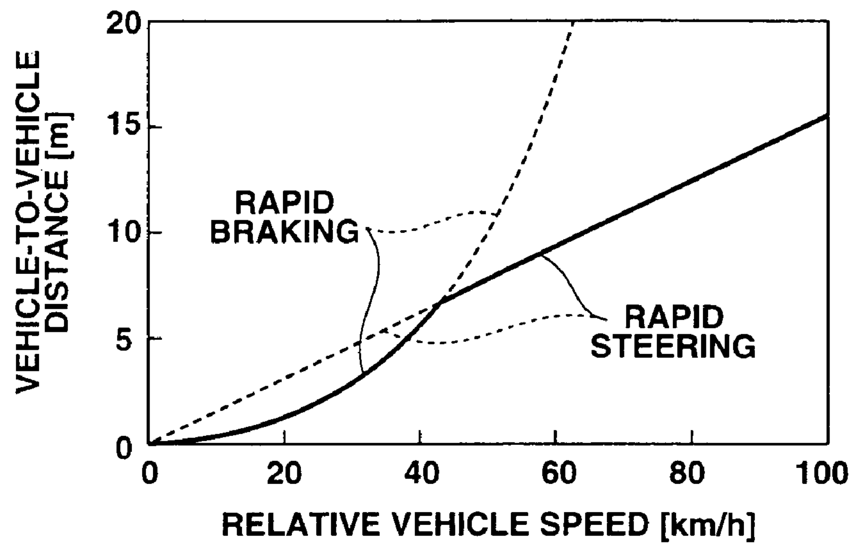
FIG. 10A is a graph showing a relation between a relative vehicle speed and a vehicle-to-vehicle distance, which is used for carrying out a collision prediction judgment.
Figure 10B:
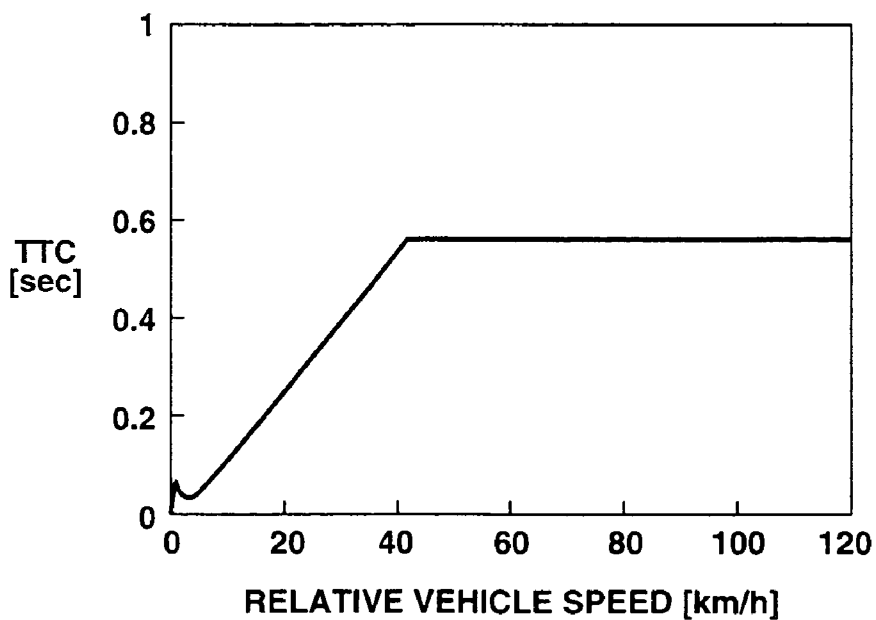
FIG. 10B is a graph showing a relation between the relative vehicle speed and a time needed for avoiding the vehicle collision, which is used for carrying out the collision prediction judgment.

FIG. 10A shows a relation between a relative vehicle speed and a vehicle-to-vehicle distance, and FIG. 10B shows a relation between the relative vehicle speed and a time-to-collision (TTC) needed for avoiding a predicted vehicle collision.

When a vehicle is facing a collision, the driver would strive to avoid the collision by rapidly braking the vehicle and/or rapidly steering the vehicle.

In this connection, the following facts have been revealed as a result of various tests.

That is, when the relative vehicle speed is relatively low, for example, lower than 40 Km/h, the vehicle-to-vehicle distance needed for avoiding the vehicle collision is shorter in case of using the rapid braking than in case of using the rapid steering. This means that if it is judged that the vehicle collision can't be avoided by the rapid braking, the collision can not be avoided by the rapid steering. Accordingly, collision prediction judgment section 41 is constructed to carry out the vehicle collision prediction judgment with respect to the rapid braking that provides the shorter vehicle-to-vehicle distance needed for the collision avoidance.

As is seen from the graph of FIG. 10A, when the relative vehicle speed is lower than about 40 Km/h, the action of rapid braking shows a shorter distance for the collision avoidance, which is smaller than about 6 m, while when the relative vehicle speed is higher than about 40 Km/h, the action of rapid steering shows a shorter distance for the collision avoidance, which is longer than about 7 m.

It is to be noted that FIG. 10B is provided with reference to the characteristics depicted by FIG. 10A. That is, prediction of a vehicle collision (viz., collision of the host vehicle with the preceding vehicle) is carried out with reference to these two graphs.

That is, for example, when the relative vehicle speed is higher than 40 Km/h, collision prediction judgment section 41 predicts a vehicle collision when the time left until the collision becomes shorter than 0.58 sec.

Figure 11:
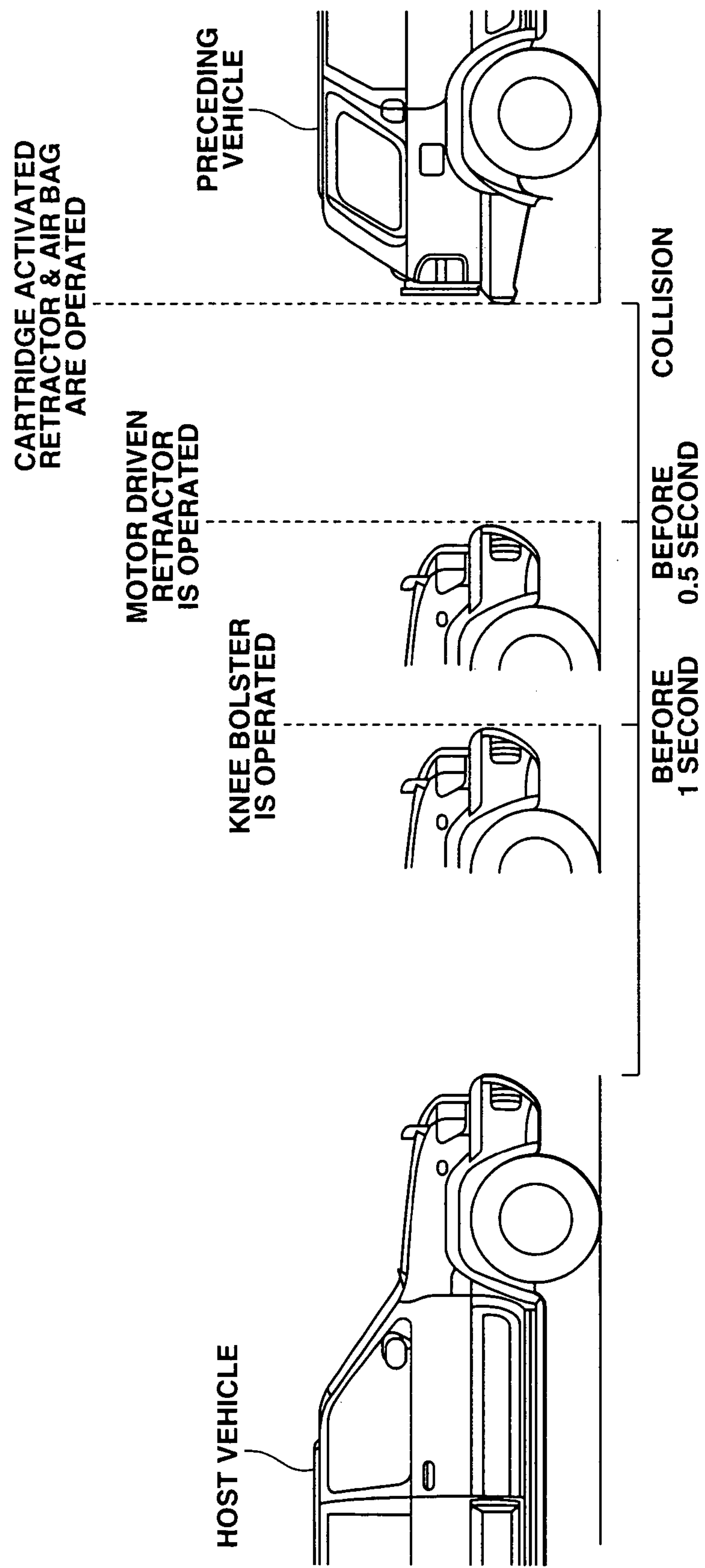
FIG. 11 is an illustration showing operation timings of various seat occupant restraining devices until a vehicle collision.

In the following, operation of restraining devices 31, 32, 33 and 34 will be described. FIG. 11 is a view showing operation start timing of these restraining devices 31, 32, 33 and 34. The programmed operation of each restraining device 31, 32, 33 or 34 has been explained with reference to the flowchart of FIG. 8. However, FIG. 11 shows the operation timing of these devices with respect to a collision of the host vehicle with the preceding vehicle.

As is seen from this drawing (FIG. 11), the host vehicle shown is about to collide against the preceding vehicle. Under this condition, based on an information signal from the long distance radar system 10, a vehicle collision is predicted. With this, sensitivity adjusting section 42 adjusts the sensitivity of short distance radar system 11.

When, based on the information signal from short distance radar system 11, it is judged that the time left until the predicted collision is 1.0 second, knee bolster 31 becomes operated. Due to operation of this knee bolster 31, the knee portion of a seat occupant is held and thus forward movement of the lower portion of the passenger is suppressed. Because the sensitivity of short distance radar system 11 has been adjusted, operation of knee bolster 31 is appropriately carried out in accordance with the precise vehicle collision prediction.

When, based on the information signal from short distance radar system 11, it is judged that the time until the predicted collision is 0.5 second, motor driven retractor 32 becomes operated. With this, the seatbelt is slightly retracted to restrain an upper portion of the seat occupant. Since the sensitivity adjustment of short distance radar system 11 has been carried out already, operation of motor driven retractor 32 is appropriately carried out in accordance with the precise vehicle collision prediction.

Now, let us assume that the host vehicle finally bumps against the preceding vehicle. Upon this, based on an information signal from accelerometer 20, the vehicle collision is detected and air bag 33 and cartridge activated retractor 34 are operated. Due to operation of air bag 33, the upper portion of the seat occupant is prevented from bumping against a front structure, such as steering wheel, dash panel or the like. Due to operation of cartridge activated retractor 34, the seatbelt is instantly retracted to much tightly restrain the upper portion of the seat occupant.

As is understood from the above-description, in passenger restraint device 100 of the first embodiment, the sensitivity of short distance radar 11 is adjusted before encountering a collision against a preceding vehicle. That is, the sensitivity is adjusted in accordance with conditions of the host and preceding vehicles before the collision, and thus, the collision prediction ability of the device 100 is increased.

Based on the information signals from short distance radar system 11 of which sensitivity has been already adjusted, operation of the reversible restraining devices 31 and 32 and that of the non-reversible restraining devices 33 and 34 are controlled. This means that the reversible restraining devices 31 and 32 and the non-reversible restraining devices 33 and 34 are controlled based on the information signals from short distance radar system 11 that has a higher detecting ability, and thus, it never occurs that operation of these restraining devices 31, 32, 33 and 34 would become poor due to deterioration of the detecting ability caused by deterioration of the surroundings.

Accordingly, according to the present invention, it is possible to provide a passenger restraint device 100 that assures an appropriate operation of the restraining devices 31, 32, 33 and 34.

When long distance radar system 10 predicts a vehicle collision, the sensitivity of short distance radar system 11 is adjusted. Thus, in case where the possibility of vehicle collision is relatively high, the collision detection ability can be increased. Furthermore, since, in case where the possibility of vehicle collision is relatively high, the vehicle collision detecting ability is increased, a so-called mis-collision detection wherein prediction of vehicle collision is erroneously issued even when there is no possibility of such vehicle collision is suppressed or at least minimized. Thus, operation of the reversible restraining devices 31 and 32 and the non-reversible restraining devices 33 and 34 is much more precisely carried out.

Among long and short distance radar systems 10 and 11 and accelerometer 20, the radar systems 10 and 11 that are of a non-contact type are subjected to adjustment in sensitivity. Accordingly, by adjusting a radio wave, ultrasonic wave or light beam, a vehicle collision can be precisely predicted, and based on the precise prediction, operation of the reversible restraining devices 31 and 32 and non-reversible restraining devices 33 and 34 can be appropriately controlled.

For the sensitivity adjustment, the signal receiving sensitivity of at least one of the radio wave, ultrasonic wave and light beam is adjusted. Accordingly, the sensitivity adjustment can be carried out without increasing a transmission power and without increasing electric power consumption.

For the sensitivity adjustment, the signal transmission intensity of at least one of the radio wave, ultrasonic wave and light beam. Accordingly, the sensitivity adjustment can be carried out appropriately without being affected by surrounding noises.

The sensitivity adjustment of short distance radar system 11 is carried out by varying the threshold value "Th2", which means an easiness with which the sensitivity of the system 11 is made. That is, such sensitivity adjustment is carried out without worrying about the hardware of long and short distance radar systems 10 and 11.

In the above-mentioned first embodiment 100, the sensitivity adjustment of short distance radar system 11 is carried out when a vehicle collision is predicted based on the information signal from long distance radar system 10. However, in place of such adjustment, if desired, the sensitivity of the accelerometer 20 may be adjusted when a vehicle collision is predicted based on the information from short distance radar system 11.

In the following, a passenger restraint device 200 of a second embodiment of the present invention will be described with reference to FIG. 12.

Figure 12:
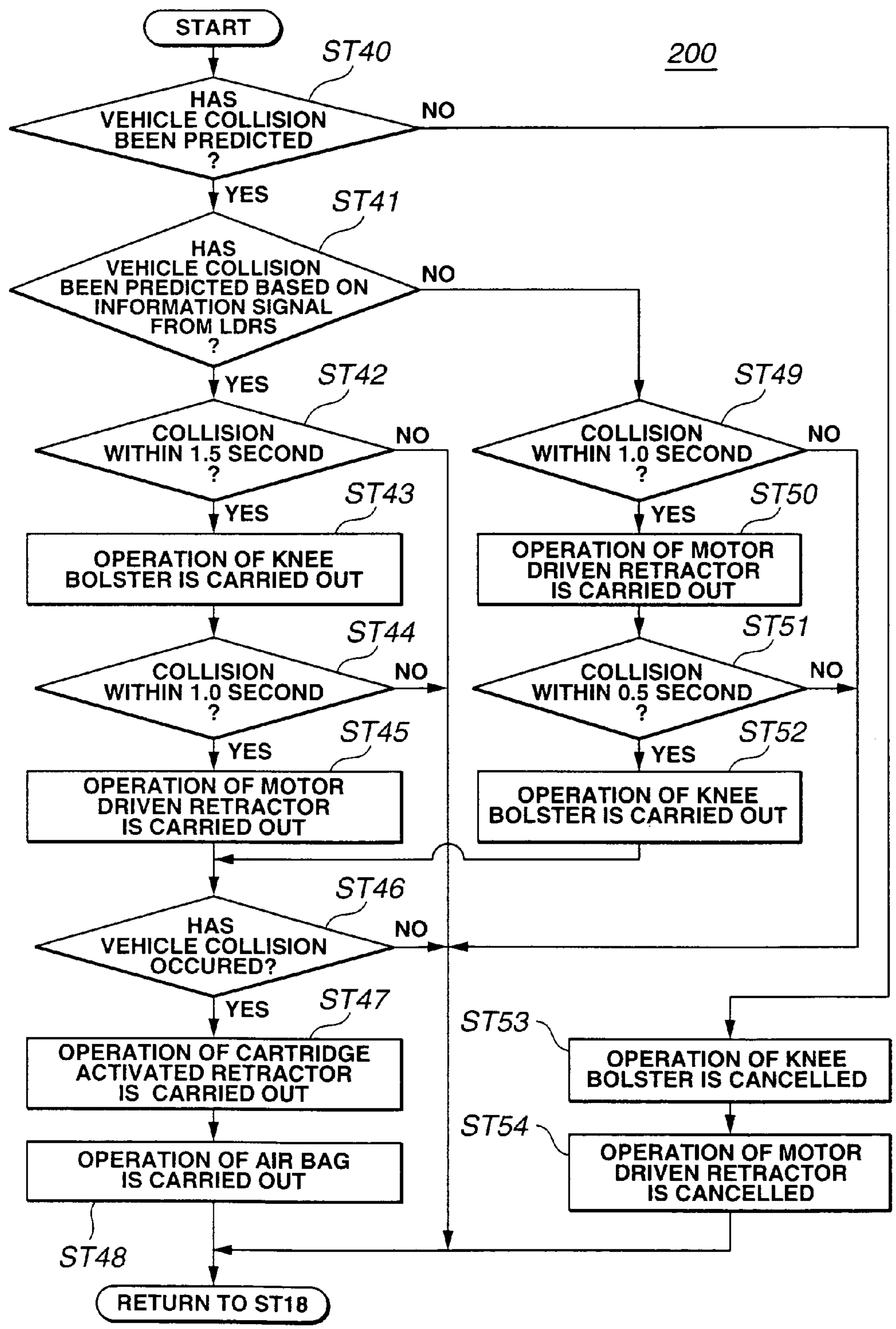
FIG. 12 is a flowchart showing programmed operation steps executed in a control unit that is employed in a passenger restraint device which is a second embodiment of the present invention.

FIG. 12 is a flowchart that shows a part of programmed operation steps executed by control unit 40 employed in the second embodiment 200 of the present invention. More specifically, the flowchart shows the detail of a modification of step ST17 of the flowchart of FIG. 6.

As will become apparent as the description proceeds, in this second embodiment 200, depending on whether a prediction of vehicle collision by long distance radar system 10 is present or not, the operation order of knee bolster 31 and motor driven retractor 32 is changed.

As is seen from the flowchart of FIG. 12, at step ST40, based on information signal from short distance radar system 11, judgment is carried out as to whether a vehicle collision has been predicted or not. If YES, that is, when the vehicle collision has been predicted, the operation flow goes to step ST41. At this step, operation timing deciding section 44 carries out judgment as to whether or not the vehicle collision has been predicted based on the information signal from long distance radar system (LDRS) 10. If YES, that is, when the vehicle collision has been predicted based on the information signal from long distance radar system 10, the operation flow goes to step ST42. At this step, operation timing deciding section 44 judges whether the predicted collision would occur within 1.5 second or not. If NO, the operation flow goes back to step ST18 of the above-mentioned flowchart of FIG. 6.

While, if YES at step ST42, that is, when it is judged that the predicted collision would occur within 1.5 second, the operation flow goes to step ST43 judging that knee bolster 31 should be operated. At this step, corresponding instruction signal is fed to knee bolster drive instruction section **45*b* for the operation of knee bolster 31**.

Then, at step ST44, operation timing deciding section 44 carries out judgment as to whether the predicted collision would occur within 1.0 second or not.

If NO, that is, when it is judged that the predicted collision would not occur within 1.0 second, the operation flow goes back to step ST18 of the flowchart of FIG. 6.

While, if YES at step ST44, that is, when it is judged that the vehicle collision would occur within 1.0 second, the operation flow goes to step ST45 judging that motor driven retractor 32 should be operated. At this step, corresponding instruction signal is fed to motor driven retractor drive instruction section **45*a* for the operation of the retractor 32**.

Then, the operation flow goes to step ST46.

Since the operation steps from ST46 to ST48 and ST53 to ST54 are the same as those from ST25 to ST27 and ST28 to ST29 of the flowchart of FIG. 8 of the above-mentioned first embodiment 100, explanation on such same steps will be omitted for simplification of the description.

While, if NO at step ST41, that is, when it is judged that the vehicle collision has not been predicted based on the information signal from long distance radar system (LDRS) 10, the operation flow goes to step ST49. At this step, operation timing deciding section 44 carries out judgment as to whether the predicted vehicle collision would occur within 1.0 second or not.

If NO at step ST49, the operation flow goes back to step ST18 of the flowchart of FIG. 6. While, if YES at step ST49, that is, when it is judged that the vehicle collision would occur within 1.0 second, the operation flow goes to step ST50 judging that motor driven retractor 32 should be operated. At this step, corresponding instruction signal is fed to motor driven retractor drive instruction section **45*a* for the operation of the retractor 32**.

Then, the operation flow goes to step ST51. At this step, operation timing deciding section 44 carries out judgment as to whether the predicted collision would occur within 0.5 second or not. If NO, the operation flow goes back to step ST18 of the flowchart of FIG. 8. While, if YES, the operation flow goes to step ST52 judging that knee bolster 31 should be operated. At this step, corresponding instruction signal is fed to knee bolster drive instruction section **45*b* for the operation of knee bolster 31**.

As is understood from the above, in the second embodiment 200, depending on whether a prediction of vehicle collision by long distance radar system 10 is present or not, the operation order of knee bolster 31 and motor driven retractor 32 is varied. That is, when such prediction is present, knee bolster 31 is operated first, while, when such prediction is not present, motor driven retractor 32 is operated first. That is, when the vehicle collision prediction is high, restraining of the seat occupant is effected by knee bolster 31 at first and then by motor driven retractor 32. This brings about a reliable operation of knee bolster 31 for supporting the knee portion of the seat occupant before the collision.

Furthermore, in the second embodiment 200, when operation of knee bolster 31 is made at first, the time until the real collision is increased which permits a reduction in operation speed of knee bolster 31. Due to reduction in this operation speed, operation of knee bolster 31 minimizes an uncomfortable feeling that would be applied to the seat occupant upon such operation.

In addition to this advantage, other advantages like the above-mentioned advantages of the first embodiment 100 are obtained by the second embodiment 200. That is, like in the first embodiment 100, reversible restraining devices 31 and 32 and non-reversible restraining devices 33 and 34 are much more precisely controlled. Based on the precise prediction on a vehicle collision, these restraining devices 31, 32, 33 and 34 are appropriately controlled.

In the second embodiment 200, the sensitivity adjustment can be carried out without increasing the transmission power and without increasing electric power consumption. Furthermore, the sensitivity adjustment can be carried out appropriately without being affected by surrounding noises.

Furthermore, in the second embodiment 200, when short distance radar system 11 that has been adjusted in sensitivity predicts a vehicle collision, operation timing of knee bolster 31 is advanced as compared with a case wherein the sensitivity adjustment is not carried out. Accordingly, in case wherein the possibility of vehicle collision is high, restraining of the seat occupant is made fast, which increases a passenger restraint ability of the device 200.

Furthermore, due to reduction in operation speed of knee bolster 31, uncomfortable feeling applied to the seat occupant upon operation of knee bolster 31 is suppressed or at least minimized.

In the following, a passenger restraint device 300 of a third embodiment of the present invention will be described with reference to FIG. 13.

Figure 13:
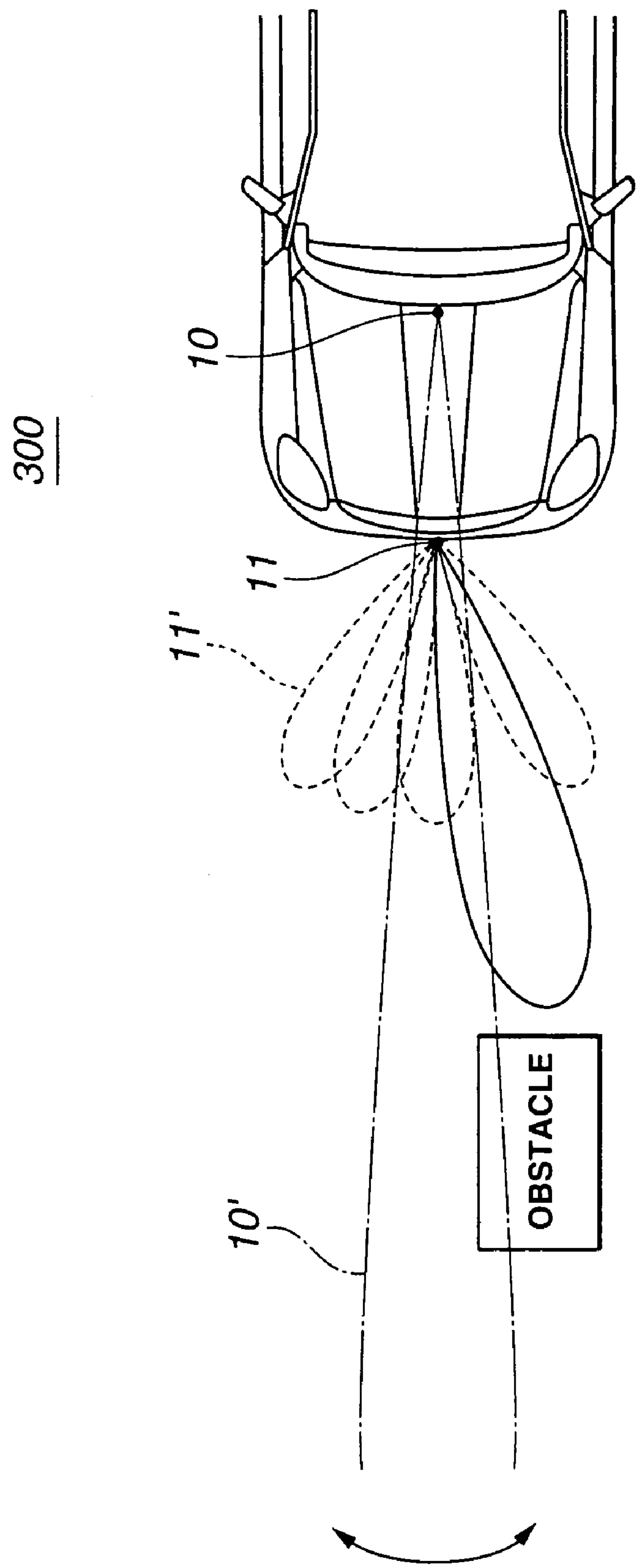
FIG. 13 is an illustration showing operation of long and short distance radar systems that are employed in a passenger restraint device of a third embodiment of the present invention.

As is seen from FIG. 13, each of long and short distance radar systems 10 and 11 employed in the third embodiment 300 emits a radio wave 10' or 11' scanning the forward zone at a predetermined cycle. By processing the emitted wave and reflected wave, collision prediction judgment section 41 detects the direction in which an obstacle (or preceding vehicle) is positioned. When long distance radar system 10 detects the obstacle, the sensitivity of short distance radar system 11 for detecting the direction of the obstacle is increased.

Figure 14:
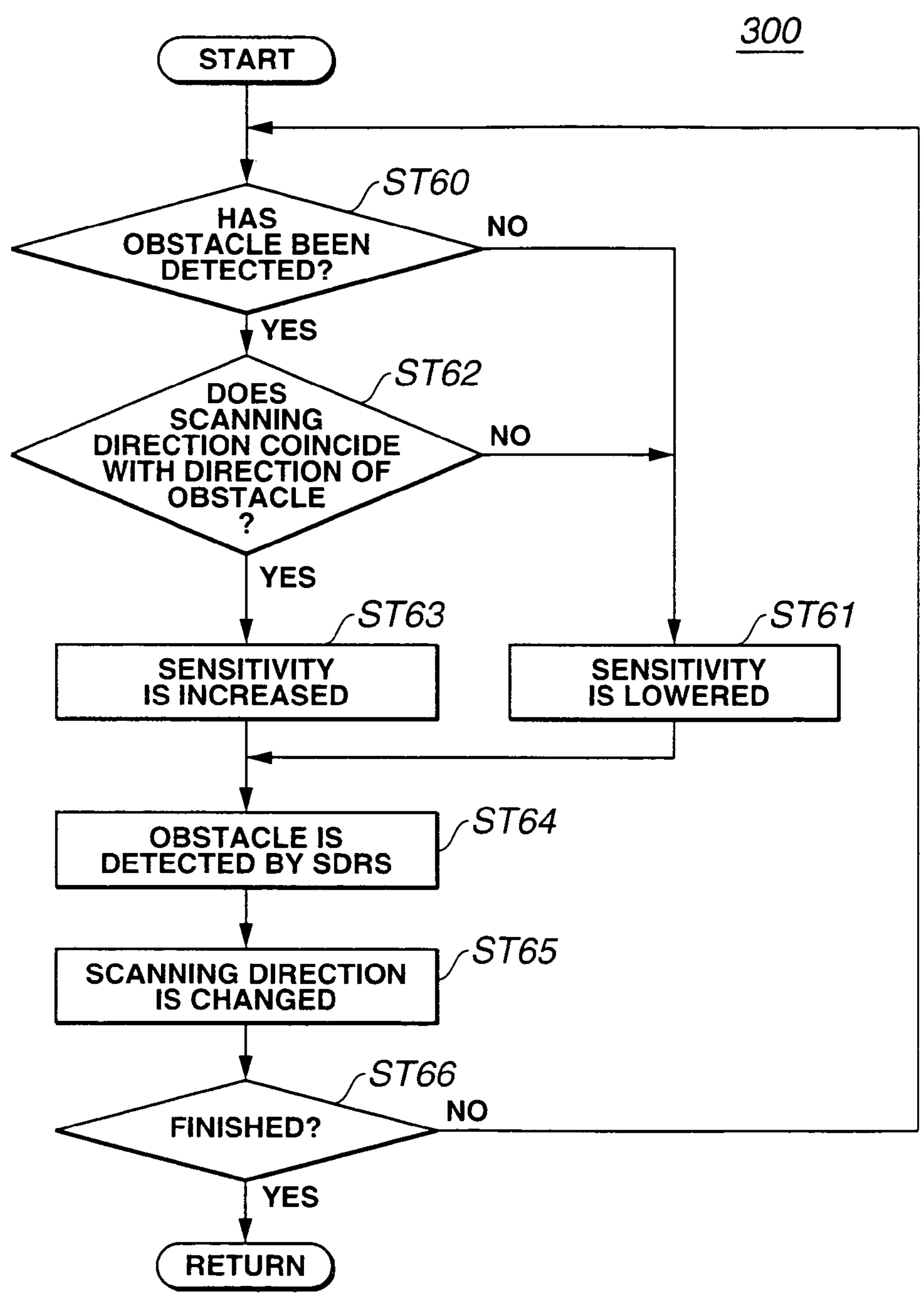
FIG. 14 is a flowchart showing programmed operation steps executed in a control unit employed in the passenger restraint device of the third embodiment.

FIG. 14 is a flowchart that shows a part of programmed operation steps executed by control unit 40 employed in the third embodiment 300. More specifically, the flowchart shows the detail of a modification of step ST12 of the flowchart of FIG. 6.

At step ST60, based on the information signal from long distance radar system 10, judgment is carried out as to whether an obstacle in front of the host vehicle has been detected or not. If NO, the operation flow goes to step ST61. At this step, no sensitivity adjustment is carried out in short distance radar system 11. While, if at step ST61 the sensitivity in a given direction has been kept increased, sensitivity adjusting section 42 returns the sensitivity of the system 11 to a lower level. Then, the operation flow goes to step ST64 which will be described hereinafter.

If YES at step ST60, that is, when an obstacle has been detected by long distance radar system 10, the operation flow goes to step ST62. At this step, judgment is carried out as to whether or not the scanning direction of short distance radar system 11 coincides with the direction in which the obstacle is located. If NO, the operation flow goes to step ST61 that has been described hereinabove.

While, if YES, that is, when the scanning direction of short distance radar system 11 coincides with the direction. of the obstacle, the operation flow goes to step ST63. At this step, sensitive adjusting section 42 increases the sensitivity of that direction of short distance radar system 11. Then, the operation flow goes to step ST64. At this step, short distance radar system (SDRS) 11 emits a radio wave against the obstacle for detecting the same. Then, the operation flow goes to step ST65. At this step, scanning direction of short distance radar system 11 is changed throughout every given forward directions. Then, at step ST66, judgment is carried out as to whether the changing of scanning direction of the system 11 throughout the every given forward directions has finished or not. If NO, the operation flow goes back to step ST60. While, if YES, that is, when the changing of scanning direction throughout the given directions has finished, the operation flow goes back to step ST13 of the flowchart of FIG. 6.

As is understood from the above, in this third embodiment 300, when, based on the information signal from long distance radar system 10, the obstacle is detected, the sensitivity of short distance radar system 11 in the direction in which the obstacle is present is increased. Thus, the prediction of vehicle collision with the obstacle can have a higher precision particularly in such direction.

In this third embodiment 300, the detection sensitivity of the system 11 in other direction in which the obstacle is not present is not increased, which lowers possibility of undesired mis-prediction. That is, as is easily known, to the direction in which such obstacle is not present, there is no need of increasing the detection sensitivity. Increasing the detection sensitivity in such unnecessary direction increases the possibility of mis-detection.

In addition to this advantage, other advantages like the above-mentioned advantages of the first embodiment 100 are obtained by the third embodiment 300. That is, like in the first embodiment 100, reversible restraining devices 31 and 32 and non-reversible restraining devices 33 and 34 are much more precisely controlled. Based on the precise prediction on a vehicle collision, these restraining devices 31, 32, 33 and 34 are appropriately controlled.

In the third embodiment 300, the sensitivity adjustment can be carried out without increasing the transmission power and without increasing electric power consumption. Furthermore, the sensitivity adjustment can be carried out appropriately without being affected by surrounding noises.

In this third embodiment 300, the sensitivity of only the direction in which a vehicle collision is predicted is adjusted higher than that of other direction. That is, increase in sensitivity is applied to only the direction in which the possibility of a vehicle collision is high, and thus, the vehicle collision prediction is precisely achieved.

In this third embodiment 300, the detection sensitivity in a direction in which the possibility of a vehicle collision is low is not increased. Accordingly, mis-detection that would be induced by increasing the sensitivity in such direction is suppressed or at least minimized.

Accordingly, vehicle collision prediction ability is much increased in this third embodiment 300, and thus, operation of reversible restraining devices 31 and 32 and non-reversible restraining devices 33 and 34 can be appropriately controlled.

In desired, the following modification may be employed in this third embodiment 300. That is, the sensitivity in the direction in which a obstacle is present is kept unchanged, and the sensitivity in the other direction in which the obstacle is not present is lowered. Also, in this modification, similar advantages are obtained.

If desired, the measures of the above-mentioned second embodiment 200 may be applied to the third embodiment 300. That is, for example, as is seen from the flowchart of FIG. 12, the operation timing of knee bolster 31 may be advanced. That is, like in the second embodiment 200, in case wherein the possibility of vehicle collision is high, restraining of the seat occupant is carried out fast. The reduction in operation speed of knee bolster 31, that would be provided by the advanced operation timing, reduces the uncomfortable feeling applied to the seat occupant.

In the following, a passenger restraint device 400 of a fourth embodiment of the present invention will be described with reference to FIGS. 15, 16 and 17.

In this fourth embodiment 400, a contact type collision sensor 12 is employed in place of the above-mentioned short distance radar system 11.

Figure 15:
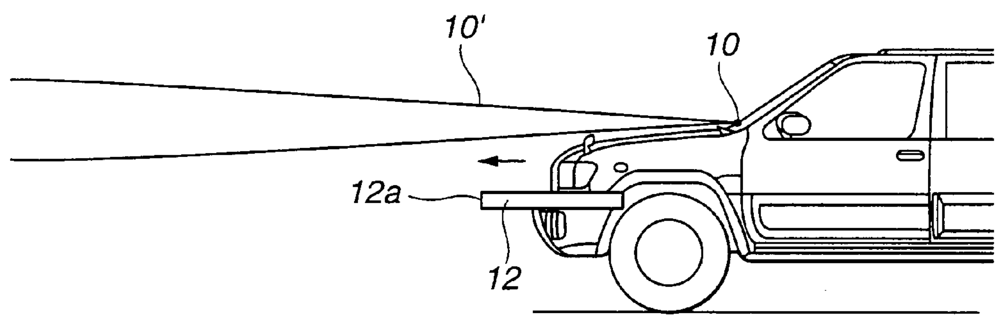
FIG. 15 is an illustration showing a contact type collision sensor mounted to the host vehicle.

FIG. 15 shows one contact type collision sensor 12 which comprises a support bar fixed to a front portion of the host vehicle and a sensor element 12*a* fixed to a leading end of the support bar. The sensor element 12*a* may be of a mechanical touch type, a vibration detecting type, a pressure detecting type or the like. Due to the nature of such type collision sensor 12, the collision detect sensitivity of the sensor 12 is increased with increase of distance between sensor element 12*a* and the front edge of the host vehicle.

Figure 16:
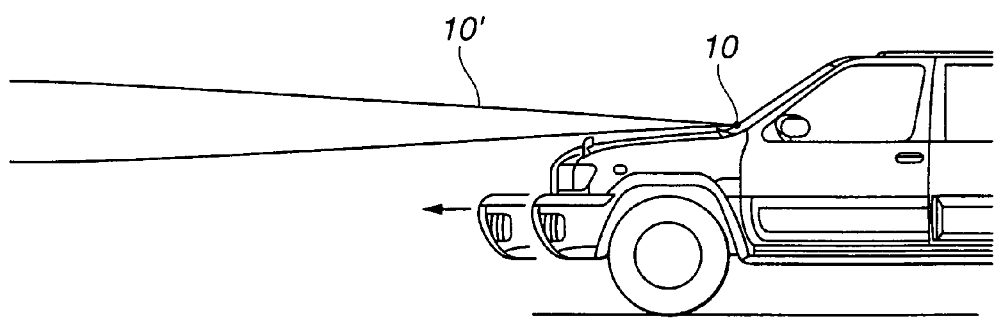
FIG. 16 is an illustration showing a modification of the contact type collision sensor.

FIG. 16 shows a modification of the contact type collision sensor. In this modification, the sensor element 12*a* is installed in a front bumper. Thus, the collision detect sensitivity of this modification can be adjusted by changing a fore-and-aft position of the bumper.

Figure 17:
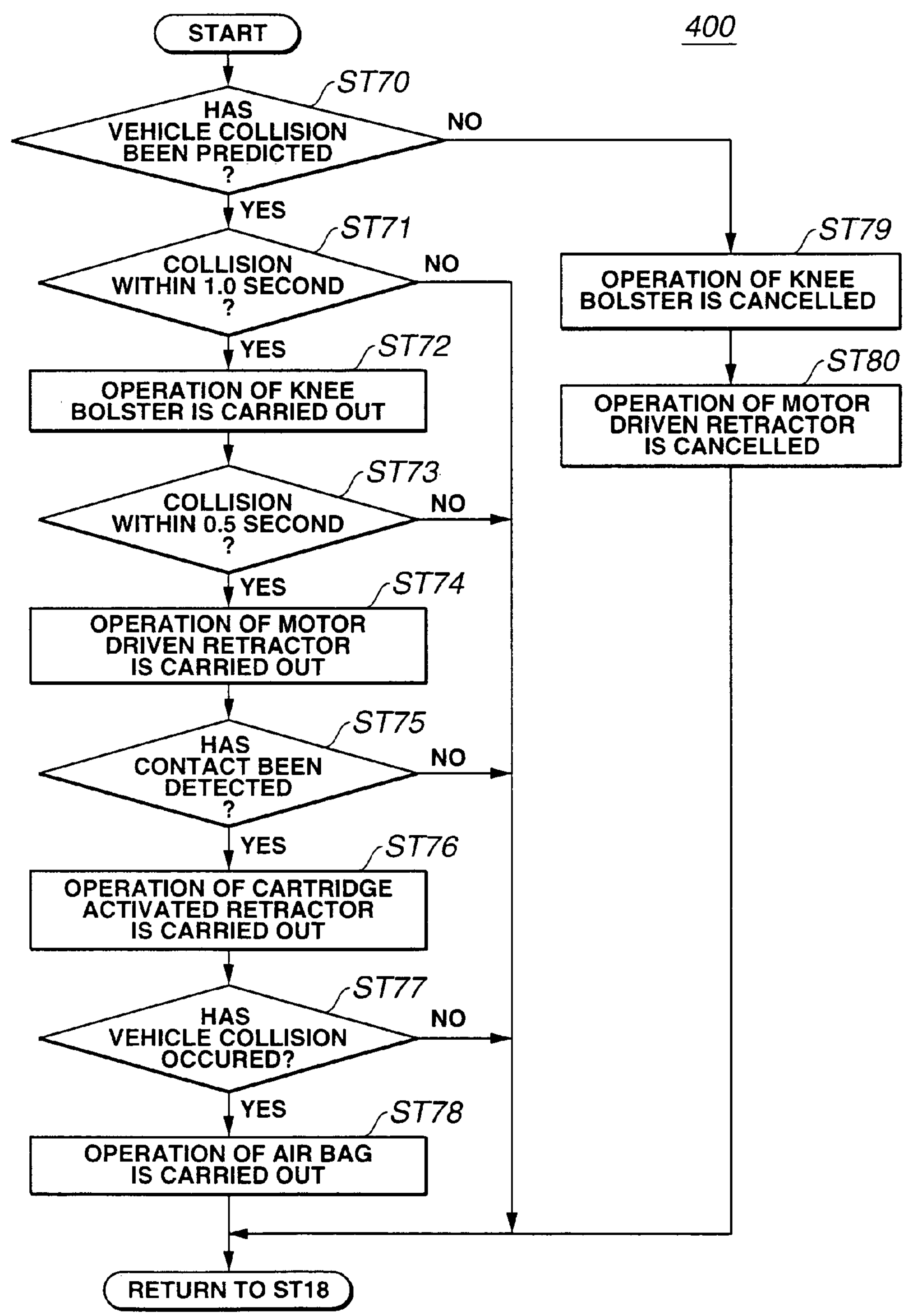
FIG. 17 is a flowchart showing programmed operation steps executed in a control unit employed in a passenger restraint device of a fourth embodiment of the present invention, the operation steps being for carrying out an operation timing judging treatment (step ST17) of the flowchart of FIG. 6.

FIG. 17 shows a flowchart that shows a part of programmed operation steps executed by a control unit 40 employed in the fourth embodiment 400 of the present invention. More specifically, in the fourth embodiment 400, the steps ST12, ST13, ST14 and ST17 of the flowchart of FIG. 6 are modified.

As is seen from the flowchart of FIG. 17, at step ST70, based on information signal from long distance radar system 10, operation timing deciding section 44 carries out judgment as to whether a vehicle collision has been predicted or not. If YES, that is, when it is judged that the vehicle collision has been predicted, the operation flow goes to step ST71.

Since the operation steps from ST71 to ST74 are substantially the same as those from ST20 to ST24 of the flowchart of FIG. 8 of the first embodiment 100, explanation of such same steps will be omitted for simplification of the description.

After step ST74, the operation flow goes to step ST75. At this step, operation timing deciding section 44 carries out judgment as to whether the contact type collision sensor 12 has detected a contact of the sensor 12 with an obstacle. If NO, the operation flow goes to step ST18 of the flowchart of FIG. 6.

While, if YES, that is, when it is judged that the sensor 12 has detected the contact, the operation flow goes to step ST76 judging that cartridge activated retractor 34 should be operated. At this step, corresponding instruction signal is fed to cartridge activated retractor drive instruction section 45*c* for operation of the retractor 34.

Then, the operation flow goes to step ST77. At this step, operation timing deciding section 44 carries out as to whether a vehicle collision has been detected or not. That is, the section 44 judges whether the result issued from collision detection judgment section 43 represents occurrence of vehicle collision or not.

If NO at step S77, that is, when it is judged that vehicle collision has not been detected, the operation flow goes back to step ST18 of the flowchart of FIG. 6. While, if YES, that is, when it is judged that the vehicle collision has been detected, the operation flow goes to step ST78 judging that air bag 33 should be operated. At this step, air bag 33 is operated. Thereafter, the operation flow goes to step ST18 of the flowchart of FIG. 6.

If NO at step ST70, that is, when it is judged that a vehicle collision has not been predicted, the operation flow goes to step ST79 and to ST80. These steps ST79 and ST80 are the same as those of the above-mentioned steps ST28 and ST29 of the first embodiment. Thereafter, the operation flow goes back to step ST18 of the flowchart of FIG. 6.

As is described hereinabove, in the fourth embodiment 400, a so-called contact detection judgment treatment (ST75) is carried out. Since collision sensor 12 is of a contact type, the sensor 12 is hardly affected by noises as compared with sensors of non-contactable type. Collision prediction judgment section 41 is configured to predict or detect a vehicle collision when an obstacle is brought into collision with the sensor 12. Thus, precise vehicle collision prediction is carried out in this fourth embodiment 400.

That is, the case wherein a vehicle collision is predicted based on the information from contact sensor 12 is a case wherein the possibility of the vehicle collision is very high. Accordingly, in this embodiment, in case wherein an obstacle collides against the sensor 12, cartridge activated retractor 34, which is the non-reversible restraining device, is instantly operated. Thus, during the stage in which a vehicle collision is predicted, the operation of such non-reversible restraining device 34 can be assuredly carried out.

Thus, in this fourth embodiment 400, like in the first embodiment 100, the restraining devices 31, 32, 33 and 34 are appropriately controlled.

Furthermore, reversible restraining devices 31 and 32 and non-reversible restraining devices 33 and 34 are much more precisely controlled.

Furthermore in this fourth embodiment 400, due to usage of the contract type sensor 12, a reliable and assured vehicle collision prediction is carried out without being affected by the surrounding noises. This promotes the assured operation of reversible and non-reversible restraining devices 31, 32, 33 and 34.

For adjusting the sensitivity of the contact type sensor 12, sensor element 12*a* is projected or retracted with respect to the vehicle body. Thus, when, due to prediction of a vehicle collision based on the information signal from long distance radar system 10, sensor element 12*a* is projected forward, the precise vehicle collision prediction is achieved much faster. This can induce an advanced operation of non-reversible restraining devices 33 and 34.

In the following, a passenger restraint device 500 of a fifth embodiment of the present invention will be described with reference to FIG. 18.

Figure 18:
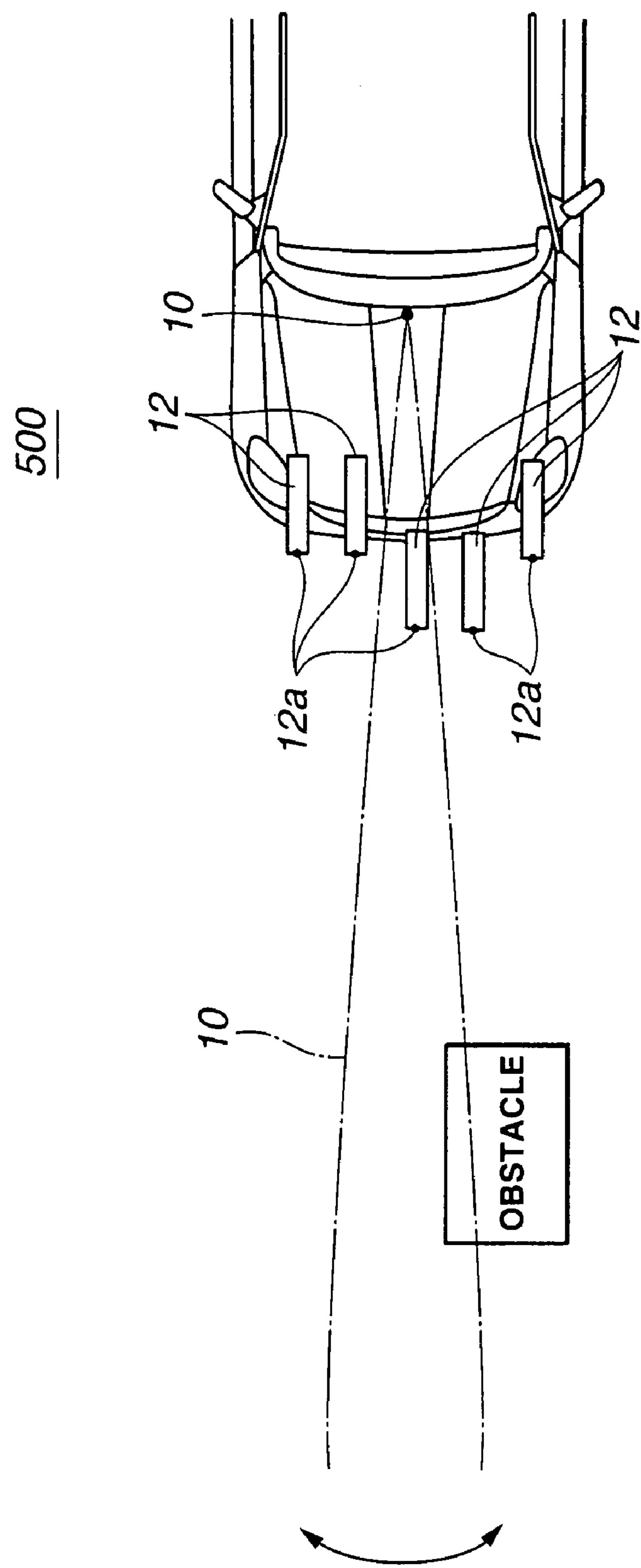
FIG. 18 is an illustration showing a plurality of contact type collision sensors employed in a passenger restraint device of a fifth embodiment of the present invention.

As is seen from FIG. 18, in this embodiment 500, a long distance radar system 10 such as one used in the above-mentioned third embodiment 300 is used, and plurality of contact type collision sensors 12 arranged at laterally spaced positions of the front part of an associated motor vehicle. The collision sensors 12 have respective sensor elements 12*a* that are projectable forward by a given distance from the front part of the vehicle.

In this fifth embodiment 500, long distance radar system 10 scans a predetermined forward zone at a predetermined cycle. Thus, when long/short distance radar system 10 or 11 detects an abstract in the traveling direction of an associated motor vehicle, collision prediction judgment section 41 detects the direction in which the obstacle is located.

When, based on information signal from long distance radar system 10, an obstacle is detected, only a sensor element 12*a* or sensor elements 12*a* of the contact type collision sensors 12 that are arranged in the direction in which the obstacle is present are subjected to the sensitivity adjustment. That is, only the sensor elements 12*a* are projected forward for increasing the sensitivity of the same, as shown in the drawing. The step for carrying out the sensitivity adjustment is substantially the same as the step ST 12 (see FIG. 6).

As is described hereinabove, in the fifth embodiment 500, only the sensor element 12*a* or sensor elements 12*a* of the contact type collision sensors 12 that are arranged in the direction in which the obstacle is present are subjected to the sensitivity adjustment. Thus, the vehicle collision prediction carried out by the fifth embodiment 500 is much improved. That is, in the fifth embodiment 500, the sensor elements 12*a* other than the sensor elements 12*a* that are subjected to the sensitivity adjustment are left unchanged in the sensitivity. Thus, unnecessary and redundant high detection by such sensor elements 12*a* is avoided, which increases an assured prediction of the obstacle. Furthermore, due to the nature of the contact type collision sensors 12, prediction of vehicle collision made by the sensors 12 is much assured.

In following, a passenger restraint device 600 of a sixth embodiment of the present invention will be described with reference to FIG. 19.

The sixth embodiment 600 is similar to the above-mentioned first embodiment 100. However, in the sixth embodiment 600, the treatment of step ST12 (see the flowchart of FIG. 6) is somewhat different. That is, in the sixth embodiment 600, the sensitivity of short distance radar system 11 is adjusted based on the higher one of a running speed of the host motor vehicle and a relative vehicle speed between the host motor vehicle and the preceding motor vehicle.

Figure 19:
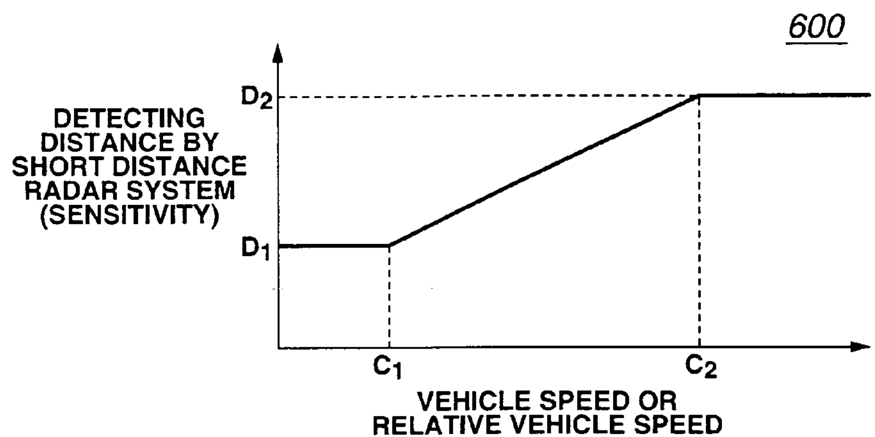
FIG. 19 a graph for explaining a sensitivity adjustment employed in a passenger restraint device of a sixth embodiment of the present invention.

FIG. 19 is a graph used for adjusting the detecting distance of short distance radar system 11 (or the sensitivity of the system 11) in accordance with the vehicle speed or relative vehicle speed. As is seen from the graph, when the vehicle speed or relative vehicle speed is lower than a lower given value "C1", sensitivity adjusting section 42 of control unit (see FIG. 2) adjusts the detecting distance of the radar system 11 to a minimum value "D1", and while the vehicle speed or relative vehicle speed is higher than a higher given value "C2", the section 42 adjusts the detecting distance to a maximum value "D2". While the vehicle speed or relative vehicle speed is within the range from the value "C1" to the value "C2", the section 42 adjusts the detecting distance to a value that linearly varies from the value "D1" to the value "D2".

As is understood from the above, in the sixth embodiment 600, the sensitivity of short distance radar system 11 is increased with increase of the vehicle speed or relative vehicle speed. This improves the prediction of a vehicle collision effected by the present invention.

Thus, in the sixth embodiment 600, like in the first embodiment 100, operation of restraining devices 31, 32, 33 and 34 is appropriately carried out.

Furthermore, reversible restraining devices 31 and 32 and non-reversible restraining devices 33 and 34 are much more precisely controlled.

Furthermore, the sensitivity adjustment can be carried out without increasing the transmission power and without increasing electric power consumption. Furthermore, the sensitivity adjustment can be carried out appropriately without being affected by surrounding noises.

Furthermore, in this sixth embodiment 600, the sensitivity is adjusted based on a higher one of the running speed of the host motor vehicle and the relative vehicle speed between the host motor vehicle and the preceding motor vehicle. That is, the distance between the two vehicles can be assuredly detected even when such speed becomes high. Thus, mismatching in operation of the restraining devices 31, 32, 33 and 34 is suppressed. That is, undesired situation wherein upon the time on which a vehicle collision is predicted, a remaining time until the vehicle collision is quite small is suppressed. Thus, by adjusting the detecting distance, the restraining devices 31, 32, 33 and 34 can be appropriately operated.

If desired, in this sixth embodiment 600, the following modifications may be employed. That is, the sensitivity may be adjusted based on the vehicle speed of the host motor vehicle. Furthermore, the sensitivity may be adjusted based on the relative vehicle speed between the two motor vehicles.

In the following, modifications of the present invention will be described.

If desired, measures of the above-mentioned embodiments 100, 200, 300, 400, 500 and 600 may be combined.

Furthermore, if desired, in place of the above-mentioned knee bolster 31 and motor driven retractor 32, an electric seat slide, an electric seat cushion angle adjuster, an electric seat back angle adjuster, an electric telescopic steering column adjuster, an electric power window, an electric sunroof controller is and an electric interior pad may be used.

Figure 20:
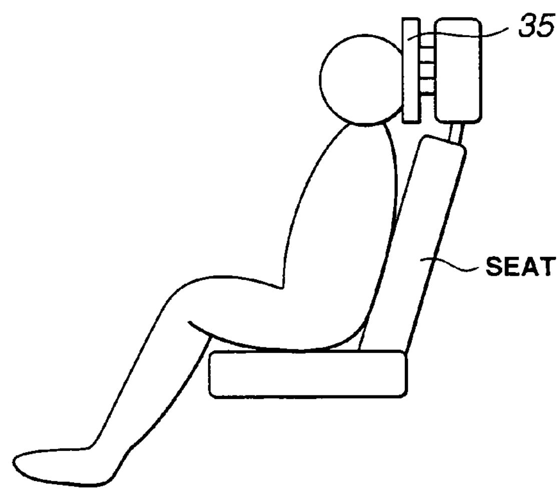
FIG. 20 is a view showing an example of a reversible type seat occupant restraining device, which is an active headrest.
Figure 21:
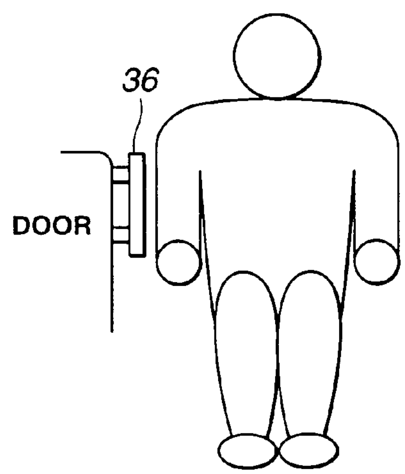
FIG. 21 is a view showing another example of the reversible type seat occupant restraining device, which is a projectable door trim.

Furthermore, as is seen from FIGS. 20 and 21, in place of the above-mentioned knee bolster 31 and motor driven retractor 32, an active headrest 35 (see FIG. 20) and an electric door trim 36 (see FIG. 21) may be used. These devices 35 and 36 are controlled by control unit 40 to respectively support or hold a head and a side portion of the seated occupant upon a vehicle collision, as shown. The actuation order of these devices 35 and 36 may be based on the actuation speed of the same, and on the degree of touch feeling applied to the seated occupant by the devices 35 and 36. If the order is based on the touch feeling, feeling of wrongness applied to the occupant is suppressed or at least minimized. Furthermore, if the order is based on the actuation speed of the devices 35 and 36, much assured restriction is carried out. Preferably, in case wherein the possibility of vehicle collision is relatively high, the order is based on the actuation speed of the devices 35 and 36.

For powering the above-mentioned reversible and non-reversible type restricting devices 31, 32, 33, 34, 35 and 36, an electric actuator, a hydraulic actuator, a spring, a cartridge-activated actuator or the like may be used. Of course, combination of these actuators is also usable.

In the above-mentioned embodiments, long and short distance radar systems 10 and 11 and contact sensor 12 are used for detecting information on a vehicle collision. However, in the present invention, other means can be used so long as the means can detect such information.

In the above-mentioned embodiments, description is directed to the collision in which a host vehicle collides against a rear portion of a preceding vehicle. However, the concept of the present invention is also usable in a side vehicle collision, a head-on collision and a vehicle rolling.

Furthermore, if desired, the means that detects or predicts is a vehicle collision may be of a self-establishing type that establishes such function by itself. Furthermore, the means for detecting or predicting the vehicle collision may of a non-self-establishing type that needs an external assistance for establishing such function. That is, in the latter type, only information signals needed for detecting or predicting a vehicle collision are detected by the means and these information signals are led to a calculating circuit. In the circuit, various calculations are carried out for detecting or predicting the vehicle collision.

The entire contents of Japanese Patent Application 2003-366269 (filed Oct. 27, 2003) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A passenger restraint device of a motor vehicle, comprising:

a plurality of predicting devices each being able to predict or detect a collision of the vehicle with an obstacle in front of the vehicle;

a sensitivity adjusting device that is able to adjust a sensitivity of at least one of the predicting devices;

reversible passenger restraining devices that are able to reversibly restrain a passenger in the vehicle;

non-reversible passenger restraining devices that are able to non-reversibly restrain the passenger in the vehicle; and a control unit that, based on a signal from the one of the predicting devices that has been subjected to the sensitivity adjustment by the sensitivity adjusting device, controls operation of the reversible and non-reversible passenger restraining devices, in which when one of the predicting devices predicts or detects the collision of the vehicle with the obstacle, the sensitivity adjusting device adjusts the sensitivity of at least one of the predicting devices, in which when one of the predicting devices predicts or detects the collision of the vehicle with the obstacle, the sensitivity adjusting device adjusts the sensitivity of at least one of the predicting devices that is other than the predicting device that has predicted or detected the vehicle collision, wherein the sensitivity is adjusted by changing the range of the at least one of the predicting devices that is other than the predicting device that has predicted or detected the vehicle collision.

2. A passenger restraint device as claimed in claim 1, in which at least one of the predicting devices is of a contactable type that is able to detect a collision of the vehicle by contacting an obstacle, and in which the sensitivity adjusting device adjusts the sensitivity of the contactable type predicting device.

3. A passenger restraint device as claimed in claim 2, in which the contactable type predicting device has a sensor element that issues an information signal when contacting the obstacle, and in which the sensitivity adjusting device changes a distance between the sensor element and a predetermined part of the vehicle.

4. A passenger restraint device as claimed in claim 2, in which the sensitivity adjusting device adjusts the sensitivity of at least one of the predicting devices by varying a threshold value employed in an algorithm for predicting a vehicle collision with the obstacle.

5. A passenger restraint device as claimed in claim 1, in which when one of the predicting devices predicts the vehicle collision with the obstacle, the sensitivity adjusting device adjusts the sensitivity of one direction of at least one of the predicting devices that is other than the predicting device that has predicted the vehicle collision, and in which said one direction is a direction in which the obstacle is detected.

6. A passenger restraint device as claimed in claim 5, in which the sensitivity of said one direction adjusted by the sensitivity adjusting device is different from that of an other direction of the at least one of the predicting devices, and in which the other direction is a direction in which the obstacle is not detected.

7. A passenger restraint device as claimed in claim 1, in which at least one of the predicting device is of a non-contactable type, in which the non-contactable type predicting device predicts a vehicle collision with the obstacle by using one of radio wave, light beam and ultrasonic wave, and in which the sensitivity adjusting device adjusts a receiving sensitivity of the non-contactable type predicting device for the radio wave, light beam or ultrasonic wave.

8. A passenger restraint device as claimed in claim 1, in which at least one of the predicting device is of a non-contactable type, in which the non-contactable type predicting device predicts a vehicle collision with the obstacle by using one of radio wave, light beam and ultrasonic wave, and in which the sensitivity adjusting device adjusts an emitting sensitivity of the non-contactable type predicting device for the radio wave, light beam or ultrasonic wave.

9. A passenger restraint device as claimed in claim 1, in which the sensitivity adjusting device adjusts the sensitivity of at least one of the predicting devices by varying a threshold value employed in an algorithm for predicting a vehicle collision with the obstacle.

10. A passenger restraint device as claimed in claim 1, in which when one of the predicting devices predicts the vehicle collision with the obstacle, the sensitivity adjusting device adjusts, based on the predicted vehicle collision, the sensitivity of at least one of the predicting devices that is other than the predicting device that has predicted the vehicle collision, and in which when the predicting device that has been adjusted in sensitivity predicts a vehicle collision with the obstacle, the sensitivity adjusting device advances an operation timing of both the reversible and non-reversible passenger restraining devices as compared with a case wherein the vehicle collision is predicted without carrying out the sensitivity adjustment of the predicting device.

11. A passenger restraint device as claimed in claim 10, in which when at least one of the reversible and non-reversible passenger restraining devices is advanced in operation timing, the sensitivity adjusting device lowers an operation speed of at least one of the reversible and non-reversible passenger restraining devices.

12. A passenger restraint device as claimed in claim 1, in which the sensitivity adjusting device increases the sensitivity of the at least one of the predicting devices with increase of a running speed of the vehicle relative to a ground on which the vehicle runs.

13. A passenger restraint device as claimed in claim 1, in which the sensitivity adjusting device increases the sensitivity of the at least one of the predicting devices with increase of a running speed of the vehicle relative to the obstacle.

14. passenger restraint device as claimed in claim 1, in which the sensitivity adjusting device increases the sensitivity of the at least one of the predicting devices with increase of a higher one between a running speed of the vehicle relative to a ground and a running speed of the vehicle relative to the obstacle.

* * * * *